United States Patent
Kuiseko et al.

(10) Patent No.: US 8,123,391 B2
(45) Date of Patent: Feb. 28, 2012

(54) SURFACE LIGHT EMITTER

(75) Inventors: Manami Kuiseko, Kyoto (JP); Akira Sato, Ritto (JP)

(73) Assignee: Konica Minolta Holdings, Inc., Tokyo (JP)

( * ) Notice: Subject to any disclaimer, the term of this patent is extended or adjusted under 35 U.S.C. 154(b) by 30 days.

(21) Appl. No.: 12/294,513

(22) PCT Filed: Jul. 5, 2007

(86) PCT No.: PCT/JP2007/063421
§ 371 (c)(1),
(2), (4) Date: Aug. 6, 2010

(87) PCT Pub. No.: WO2008/020514
PCT Pub. Date: Feb. 21, 2008

(65) Prior Publication Data
US 2011/0019426 A1 Jan. 27, 2011

(30) Foreign Application Priority Data
Aug. 17, 2006 (JP) .................................. 2006-222527

(51) Int. Cl.
*F21V 7/04* (2006.01)
(52) U.S. Cl. ........ 362/606; 362/610; 362/615; 362/620; 362/626
(58) Field of Classification Search .......... 362/600–634, 362/97.1–97.4; 385/129–132, 146, 147, 385/901
See application file for complete search history.

(56) References Cited

U.S. PATENT DOCUMENTS
6,215,936 B1 * 4/2001 Yoshikawa et al. ........... 385/133
6,259,854 B1 * 7/2001 Shinji et al. ................... 385/146
(Continued)

FOREIGN PATENT DOCUMENTS
JP 2000-148032 A 5/2000
(Continued)

OTHER PUBLICATIONS

Notification of Transmittal of Translation of the International Preliminary Report on Patentability and Written Opinion Translation mailed Feb. 26, 2009, concerning International Application No. PCT/JP2007/063421 filed on Jul. 5, 2007.

(Continued)

*Primary Examiner* — Anabel Ton
*Assistant Examiner* — Danielle Allen
(74) *Attorney, Agent, or Firm* — Cozen O'Connor

(57) ABSTRACT

A surface light emitter comprising a surface-emitting device is notably increased in the front brightness of light outputted from the surface-emitting device.

In the surface light emitter comprising the surface-emitting device 20 and a light control sheet 10, a repetitive concavo-convex pattern of trapezoidal from in section is formed at least on one side of the light control sheet and has planar portions 12a at distal ends of projections of the concavo-convex pattern tightly bonded to an output surface 21a of the surface-emitting device. The light control sheet satisfies a condition $0.75 > D > 4[(\sin\theta - 1/n)^2 + 0.034]$ where $\theta$ represents the apex angle formed by opposite slant sides of the trapezoidal projection of the light control sheet, n represents the refractive index of the light control sheet, and D represents the ratio of a length of a zone to a one-cycle length of the repetitive concavo-convex pattern of the light control sheet as determined in one of the pattern arrangement directions, the zone tightly bonded to the output surface of the surface-emitting device.

9 Claims, 31 Drawing Sheets

U.S. PATENT DOCUMENTS

| | | | |
|---|---|---|---|
| 6,461,031 B1* | 10/2002 | Hata | 362/551 |
| 7,004,610 B2 | 2/2006 | Yamashita et al. | 362/606 |
| 7,372,079 B2* | 5/2008 | Kuiseko et al. | 257/98 |
| 7,689,072 B2* | 3/2010 | Bulthuis et al. | 385/14 |
| 7,690,829 B2* | 4/2010 | Sato et al. | 362/606 |
| 7,711,231 B2* | 5/2010 | Hwang et al. | 385/131 |
| 2003/0103761 A1* | 6/2003 | Lam et al. | 385/146 |
| 2004/0120682 A1* | 6/2004 | Bhagavatula et al. | 385/137 |
| 2006/0221634 A1* | 10/2006 | Sato et al. | 362/611 |
| 2007/0041701 A1* | 2/2007 | Yang et al. | 385/146 |
| 2007/0176195 A1* | 8/2007 | Kuiseko et al. | 257/98 |
| 2008/0130316 A1* | 6/2008 | Kinoshita et al. | 362/620 |
| 2008/0260336 A1* | 10/2008 | Hwang et al. | 385/120 |
| 2009/0116221 A1* | 5/2009 | Sato et al. | 362/97.1 |

FOREIGN PATENT DOCUMENTS

| | | |
|---|---|---|
| JP | 2002-116441 A | 4/2002 |
| JP | 2002-222604 A | 8/2002 |

OTHER PUBLICATIONS

Japanese Notification of Reasons for Refusal dated Apr. 5, 2011, for the counterpart Japanese Application, together with an English translation thereof.

* cited by examiner (A)

(B)

(A)

(B)

(A)

(B)

(C)

(A)

(B)

(C)

(A)

(B)

(A)

(B)

(A)

(B)

(A)

(B)

(C)

(A)

(B)

1.93

1.93

2.22

2.37

2.22

2.03

(A)

(B)

SURFACE LIGHT EMITTER

RELATED APPLICATIONS

This application is a National Stage of International Application No. PCT/JP2007/063421, filed Jul. 5, 2007, which is based on Japanese Patent Application No. 2006-222527, the entire contents of which is incorporated herein by reference.

TECHNICAL FIELD

The present invention relates to a surface light emitter comprising a surface-emitting device and adapted to achieve a notable increase in the front brightness of light emitted therefrom.

BACKGROUND ARTS

With the increased diversity of IT devices and the like, recent years have seen increasing needs for compact surface-emitting devices consuming less power. As one of such surface-emitting devices, an electroluminescent device (hereinafter, abbreviated as EL device) is drawing attention.

Such EL devices are generally classified into an inorganic EL device and an organic EL device by the material used therein.

The inorganic EL device is generally adapted to emit light as follows. A high electric field is applied to a luminous portion whereby electrons are accelerated in the high electric field to impinge upon a luminescence center, which is excited to emit light. On the other hand, the organic EL device is adapted to emit light as follows. Electrons and holes are injected into a luminous layer from an electron injection electrode and a hole injection electrode, respectively. The injected electrons and holes are combined together in the luminous layer so as to bring an organic material into an excited state. The organic material emits light when the material in the excited state returns to a ground state. The organic EL device has an advantage that this device can be driven with a lower voltage than the inorganic EL device.

In the case of the organic EL device, a luminous element capable of emitting light of a desired color can be obtained by selecting a suitable luminous material. Further, the organic EL device is also adapted to emit white light by using a suitable combination of luminous materials. It is also is anticipated to use the organic EL device as a backlight of a liquid crystal display device and the like.

In a case where the organic EL device is used as the backlight of the liquid crystal display device or the like, the EL device is generally required of front brightness on the order of 2000 to 4000 cd/m$^2$.

However, when the surface-emitting device such as the above EL device is activated to emit light, the emitted light beams travel in various directions. Hence, many of the beams undergo total internal reflection at an output surface and the like of the surface-emitting device so as to be trapped in the surface-emitting device. It is therefore difficult for the device to achieve a sufficient front brightness. Particularly, the organic EL device has a problem that the device can only provide brightness on the order of 1000 to 1500 cd/m$^2$ if it is designed to ensure a sufficient light emission life.

In the art, a surface light emitter has been proposed which is provided with a light control sheet as follows in order to increase the front brightness by extracting light trapped in the surface-emitting device, such as the organic EL device, when the surface-emitting device is activated to emit light (see Japanese Unexamined Patent Publication No. 2000-148032). The light control sheet is formed with a plurality of projections and is tightly bonded to the output surface of the surface-emitting device at surfaces of distal ends of the projections thereof.

However, even though the light control sheet formed with the plural projections is tightly bonded to the output surface of the surface-emitting device at the surfaces of the distal ends of the projections thereof, as described above, the light reflection and the like vary greatly depending upon the configuration or arrangement of the projections of the light control sheet. The problem of inability to achieve the sufficient increase in the front brightness is still unsolved. Specifically, the prior-art surface light emitter exhibits the maximum brightness on the order of 1500 to 2000 cd/m$^2$ and achieves only about a 1.5-fold increase in the front brightness in maximum. It is still difficult to obtain a sufficient brightness.

DISCLOSURE OF THE INVENTION

In the surface light emitter comprising the surface-emitting device, the invention seeks to achieve a significant increase in the front brightness of the light outputted therefrom.

Means for Solving the Problem

According to a first aspect of the invention for achieving the above object, a surface light emitter comprising a surface-emitting device and a light control sheet is characterized in that a repetitive concavo-convex pattern of trapezoidal form in section is formed at least on one side of the light control sheet and has planar portions at distal ends of projections thereof tightly bonded to an output surface of the surface-emitting device, and that the light control sheet satisfies a condition $0.75 > D > 4[(\sin\theta - 1/n)^2 + 0.034]$ where $\theta$ represents the apex angle formed by opposite slant sides defining the trapezoidal projection of the light control sheet, n represents the refractive index of the light control sheet, and D represents the ratio of a length of a zone to a one-cycle length of the repetitive concavo-convex pattern of the light control sheet as determined in one of the pattern arrangement directions, the zone tightly bonded to the output surface of the surface-emitting device.

It is noted here that the phrase "the planar portions at the distal ends of the projections of the concavo-convex pattern tightly bonded to the output surface of the surface-emitting device" means to bond the planar portions using an optical adhesive or a material transparent to light having a given wavelength.

In the surface light emitter of the first aspect hereof, an arrangement may be made such that in a case where the concavo-convex pattern of the light control sheet has different ratios D of the length of the zone tightly bonded to the output surface of the surface-emitting device to the one-cycle length of the concavo-convex pattern as determined in the pattern arrangement directions, the smaller value of the ratio D satisfies the condition $0.75 > D > 4[(\sin\theta - 1/n)^2 + 0.034]$.

In the surface light emitter of the first aspect hereof, it is preferred that the projection of the concavo-convex pattern formed on the one side of the light control sheet has a cross-sectional profile of isosceles trapezoid shape.

In the surface light emitter of the first aspect hereof, it is preferred that in a case where the projection of the concavo-convex pattern formed on the one side of the light control sheet is shaped like a truncated pyramid, the ratio D satisfies a condition $0.58 > D > 4[(\sin\theta - 1/2)^2 + 0.058]$. The truncated pyramid shape means a configuration of a pyramid truncated at crest so as to have a cross-sectional profile of trapezoid shape.

In the surface light emitter of the first aspect hereof, it is preferred that in a case where the projection of the concavo-convex pattern formed on the one side of the light control sheet is shaped like a truncated cone, the ratio D satisfies a condition $0.55 > D > 4[(\sin \theta - \frac{1}{2})^2 + 0.04]$. The truncated cone shape means a configuration of a cone truncated at crest so as to have a cross-section profile of trapezoid shape.

In the surface light emitter of the first aspect hereof, it is preferred that in a case where a recess of the concavo-convex pattern formed on the one side of the light control sheet is shaped like an inverted pyramid or a truncated inverted pyramid, the ratio D satisfies a condition $0.4 > D > 4[(\sin \theta - \frac{1}{2})^2 + 0.034]$.

According to a second aspect of the invention for achieving the above object, a surface light emitter comprising a surface-emitting device and a light control sheet is characterized in that a repetitive concavo-convex pattern is formed at least on one side of the light control sheet and has planar portions at distal ends of projections thereof tightly bonded to an output surface of the surface-emitting device, and wherein the light control sheet satisfies a condition $0.04S0 < S1 < 1.4S2$ where S0 represents the luminous area of the surface-emitting device, S1 represents the area of zones where the projections are tightly bonded to the output surface of the surface-emitting device, and S2 represents the area of zones having higher front brightness than that of the zones where the projections are tightly bonded to the output surface of the surface-emitting device.

In the surface light emitter of the second aspect hereof, the projection of the concavo-convex pattern formed on the one side of the light control sheet preferably has preferably a cross-sectional profile of trapezoid shape or more preferably of isosceles trapezoid shape.

The surface light emitter of the second aspect hereof may more preferably satisfy a condition $0.09S0 < S1 < 0.5S2$ where S0 represents the luminous area of the surface-emitting device, S1 represents the area of the zones where the projections are tightly bonded to the output surface of the surface-emitting device, and S2 represents the area of the zones having higher front brightness than that of the zones where the projections are tightly bonded to the output surface of the surface-emitting device.

Effects of the Invention

The surface light emitter according to the first aspect of the invention can offer the following effect when the light control sheet, at least one side of which is formed with the repetitive concavo-convex pattern having a trapezoidal cross-sectional profile, is tightly bonded to the output surface of the surface-emitting device at the planar portions at the distal ends of the projections thereof in the following manner. That is, the light control sheet is adapted such that the ratio D of the length of the zone to the one-cycle length of the repetitive concavo-convex pattern of the light control sheet as determined in one of the pattern arrangement directions, the zone tightly bonded to the output surface of the surface-emitting device, satisfies the above condition $0.75 > D > 4[(\sin \theta - 1/n)^2 + 0.034]$ where $\theta$ represents the apex angle formed by the opposite slant sides defining the trapezoidal projection of the light control sheet, and n represents the refractive index of the light control sheet. In a case where the light control sheet is not provided, the light undergoes the total internal reflection at the output surface of the surface-emitting device. In this surface light emitter, however, the light is not reflected by the zones where the planar portions at the distal ends of the projections of the light control sheet are tightly bonded but is guided into the light control sheet. Much of the light so guided into the light control sheet is reflected or refracted by the slant sides of the projections of trapezoidal form in section. Hence, the light thus reflected or refracted is guided to the output surface of the light control sheet and outputted therefrom. Further, the output surface of the surface-emitting device outputs light at an angle less than a critical angle from its zones to which the planar portions at the distal ends of the projections are not tightly bonded. The light thus outputted is also refracted by the above light control sheet so as to be outputted from the output surface of the light control sheet.

As a result, the surface light emitter of the first aspect of the invention is significantly increased in the front brightness of the light guided through and outputted from the light control sheet as viewed from the front and from a range of ±15° from the front. The surface light emitter achieves roughly a more than 1.6-fold increase in the front brightness as compared with the case where the light control sheet is not provided.

In the surface light emitter of the first aspect wherein the projection of the concavo-convex pattern formed on the one side of the light control sheet is shaped like a truncated pyramid, if the above-described ratio D satisfies the condition $0.58 > D > 4[(\sin \theta - \frac{1}{2})^2 + 0.058]$, the amount of light outputted from the output surface of the light control sheet is further increased so that the above-described front brightness is increased further.

In the surface light emitter of the first aspect wherein the projection of the concavo-convex pattern formed on the one side of the light control sheet is shaped like a truncated cone, if the above-described ratio D satisfies the condition $0.55 > D > 4[(\sin \theta - \frac{1}{2})^2 + 0.04]$, the amount of light outputted from the output surface of the light control sheet is further increased so that the above-described front brightness is increased further.

In the surface light emitter of the first aspect wherein the recess of the concavo-convex pattern formed on the one side of the light control sheet is shaped like an inverted pyramid or a truncated inverted pyramid, if the above-described ratio D satisfies the condition $0.4 > D > 4[(\sin \theta - \frac{1}{2})^2 + 0.034]$, the amount of light outputted from the output surface of the light control sheet is further increased so that the above-described front brightness is increased further.

The surface light emitter according to the second aspect of the invention can offer the following effect when the light control sheet, at least on one side of which is formed with the repetitive concavo-convex pattern, is tightly bonded to the output surface of the surface-emitting device at the planar portions at the distal ends of the projections thereof in the following manner. That is, the light control sheet is adapted to satisfy the condition $0.04S0 < S1 < 1.4S2$ where S0 represents the luminous area of the surface-emitting device, S1 represents the area of the zones where the projections are tightly bonded to the output surface of the surface-emitting device, and S2 represents the area of the zones having higher front brightness than that of the zones where the projections are tightly bonded to the output surface of the surface-emitting device. The surface light emitter is significantly increased in the front brightness of the light guided through and outputted from the light control sheet as viewed from the front and from the range of ±15° from the front. The surface light emitter achieves roughly a more than 1.6-fold increase in the front brightness as compared with the case where the light control sheet is not provided.

If the surface light emitter of the second aspect is adapted to satisfy the condition $0.09S0 < S1 < 0.5S2$ where S0 represents the luminous area of the surface-emitting device, S1 represents the area of the zones where the projections are tightly bonded to the output surface of the surface-emitting device, and S2 represents the area of the zones having higher front brightness than that of the zones where the projections are tightly bonded to the output surface of the surface-emitting device, the amount of light outputted from the output surface of the light control sheet is further increased so that the above-described front brightness is increased further.

BEST MODES FOR CARRYING OUT THE INVENTION

Next, surface light emitters according to preferred embodiments of the invention will be specifically described with reference to the accompanying drawings. It is noted that the surface light emitters according to the invention are not limited to the following embodiments but changes or modifications may be made thereto as needed unless such changes or modifications deviate from the scope of the invention.

Embodiment 1

In a surface light emitter of an embodiment 1, a light control sheet 10A is used as a light control sheet 10. As shown in FIG. 1A and FIG. 1B, the light control sheet 10A has a configuration wherein projections 12 shaped like a truncated square pyramid and having square planar portions 12a at distal ends thereof are consecutively formed on one side of a transparent substrate 11 as arranged in x-direction and y-direction of the substrate 11. The projection 12 is configured such that the cross-sectional profiles thereof in the x-direction and in the y-direction of the transparent substrate 11 are the same isosceles trapezoid.

As shown in FIG. 2, the surface light emitter of the embodiment 1 employs a surface-emitting device 20 comprising an organic EL device wherein an organic EL layer 23 and a counter electrode 24 are overlaid on a surface of a transparent substrate 21, on which surface a transparent electrode 22 is overlaid. The planar portions 12a at the distal ends of the truncated-pyramid shaped projections 12 of the above light control sheet 10A are optically bonded to an output surface 21a of the transparent substrate 21, from which surface light emitted by the surface-emitting device 20 is outputted. The phrase "optically bond" means to bond the light control sheet 10A to the output surface 21a of the transparent substrate 21 in a manner that the light outputted from the output surface 21a is refracted very little by this bonded area and guided into the projections 12 of the light control sheet 10A.

In the surface light emitter of the embodiment 1, the light control sheet 10A is designed to satisfy the following conditions. Provided that $\theta$ represents the apex angle of the projection 12 of the light control sheet 10A and n represents the refractive index of the light control sheet 10A, a ratio Dx of the x-length of a zone where the planar portion 12a at the distal end of the projection 12 is bonded to the output surface 21a of the surface-emitting device 20 satisfies a condition $0.75 > Dx > 4[(\sin \theta - 1/n)^2 + 0.034]$, the x-length determined in the x-direction of the light control sheet 10A. Further, a ratio Dy of the y-length of the zone where the planar portion 12a at the distal end of the projection 12 is bonded to the output surface 21a of the surface-emitting device 20 satisfies a condition $0.75 > Dy > 4[(\sin \theta - 1/n)^2 + 0.034]$, the y-length determined in the y-direction of the light control sheet 10A.

Hereat, the values of Dx, DY are defined to be less than 0.75 for the following reasons. If the values of Dx, DY exceed 0.75, the area of the planar portion 12a defining the distal end of the projection 12 and tightly bonded to the output surface 21a of the surface-emitting device 20 is increased so much as to entail the following problem. Although the amount of light guided from the output surface 21a of the surface-emitting device 20 into the light control sheet 10A via the projection 12 is increased, much of the light guided into the light control sheet 10A is not reflected by slant sides 12b of the projection 12 but is directly guided to an output surface 14 of the light control sheet 10A, at which surface the light undergoes the total internal reflection so as to be reflected back. Therefore, the light outputted from the output surface 14 of the light control sheet 10A is decreased in intensity.

When the surface-emitting device 20 of the surface light emitter of the embodiment 1 is activated to emit light, some of the light is subjected to the total internal reflection at the output surface 21a of the surface-emitting device 20 if the surface-emitting device is not provided with the light control sheet. However, the surface-emitting device 20 provided with the light control sheet does not produce the total internal reflection at the bonded area where the planar portion 12a at the distal end of the projection 12 of the light control sheet 10A is bonded, so that the light is guided into the light control sheet 10A, as shown in FIG. 3. Much of the light thus guided into the light control sheet 10A is deflected by the slant side 12b of the projection 12, the slant side defining an interface between the projection 12 progressively decreased in size toward the output surface 21a of the surface-emitting device 20 and a hollow portion 13. The deflected light is guided to the output surface 14 of the light control sheet 10A and outputted therefrom.

Even a light beam outputted from an area of the output surface 21a, to which area the planar portion 12a at the distal end of the projection 12 is not bonded, is guided into the hollow portion 13 and outputted to a front side of the light control sheet 10A, although the light beam is slightly deflected by the slant side 12b of the projection so as to be changed in moving direction.

Further, a light beam outputted from the output surface 21a in a direction perpendicular to the slant side 12b of the projection 12 of the light control sheet 10A is guided into the projection 12 through this slant side 12b and is deflected by the opposite slant side 12b of the projection 12. Thus, the deflected light beam is outputted to the front side of the light control sheet 10A.

As a result, the surface light emitter of the embodiment 1 is significantly increased in the front brightness of the light outputted from the output surface 14 of the light control sheet 10A, as viewed from the front and from a range of ±15° from the front. Thus, the surface light emitter of this embodiment achieves roughly a more than 1.6-fold increase in the front brightness as compared with the case where the light control sheet 10A is not provided.

In the case where the surface-emitting device 20 was activated to emit light as described above, the front brightness of the light outputted from the output surface 14 of the light control sheet 10A was examined. In FIG. 4, a gray area represents a zone s1 where the planar portion 12a at the distal end of the projection 12 is bonded, a white area represents a zone s2 having a higher front brightness than the zone s1 where the planar portion 12a is bonded, and a black area represents a zone s3 having a lower front brightness than the zone s1 where the planar portion 12a is bonded.

The surface light emitter of this embodiment was examined for a relation among the luminous area S0 of the surface-emitting device 20, namely the area of the output surface 21a of the surface-emitting device 20; the area S1 of the zones where the planar portions 12a of the projections 12 were bonded to the output surface 21a of the surface-emitting device 20, namely the total area of the gray zones s1 shown in FIG. 4; and the area S2 of the zones having the higher front brightness than the planar portions 12a of the projections 12 bonded to the output surface 21a, namely the total area of the white zones s2 shown in FIG. 4. The surface light emitter satisfied a condition 0.04S0<S1<1.4S2.

The surface light emitter of the embodiment 1 employs the light control sheet 10A wherein the truncated-pyramid shaped projections 12 formed with the square planar portions 12a at the distal ends thereof are consecutively formed on the one side of the transparent substrate 11 in the x-direction and the y-direction. However, it is also possible to employ a light control sheet 10A', as shown in FIG. 5A, FIG. 5B, wherein the truncated-pyramid shaped projections 12 are formed on the one side of the transparent substrate 11 as arranged in the x-direction and the y-direction thereof at required space intervals.

While the surface light emitter of the embodiment 1 employs the organic EL device as the surface-emitting device 20, the surface-emitting device 20 may be any device adapted for plane emission. Hence, inorganic EL devices and the like are also usable. However, it is particularly effective to employ the organic EL device having a potential for considerable improvement in the brightness.

Embodiment 2

In a surface light emitter of an embodiment 2, a light control sheet 10B is used as the light control sheet 10. As shown in FIG. 6A to FIG. 6C, the light control sheet has a configuration wherein the projections 12 shaped like a truncated rectangular pyramid and formed with rectangular planar portions 12a at the distal ends thereof are consecutively formed on the one side of the transparent substrate 11 as arranged in the x-direction and the y-direction thereof. The above projection 12 is configured such that the cross-sectional profiles thereof in the x-direction and in the y-direction of the transparent substrate 11 are isosceles trapezoids which have the same height but different shapes.

Similarly to the surface light emitter of the embodiment 1, the surface light emitter of the embodiment 2 is also assembled such that the planar portions 12a at the distal ends of the truncated-pyramid shaped projections 12 of the above light control sheet 10B are optically bonded to the output surface 21a of the transparent substrate 21 from which surface the light emitted by the surface-emitting device 20 is outputted.

In the surface light emitter of the embodiment 2, the light control sheet 10b is designed as follows. It is provided that θ1 represents the apex angle of the isosceles trapezoidal cross-section of the projection 12 in the x-direction of the light control sheet 10B; θ2 represents the apex angle of the isosceles trapezoidal cross-section of the projection 12 in the y-direction thereof; and n represents the refractive index of the light control sheet 10B. The light control sheet 10B has a ratio Dx of the x-length of the zone where the planar portion 12a at the distal end thereof is bonded to the output surface 21a of the surface-emitting device 20, the x-length determined in the x-direction of the light control sheet 10B. The light control sheet 10B has a ratio Dy of the y-length of the zone where the planar portion 12a at the distal end thereof is bonded to the output surface 21a of the surface-emitting device 20, the y-length determined in the y-direction of the light control sheet 10B. At least one of the ratios Dx and DY satisfies the condition $0.75>Dx>4[(\sin θ1-1/n)^2+0.034]$ or $0.75>Dy>4[(\sin θ2-1/n)^2+0.034]$. As a matter of course, the light control sheet 10B may also be designed such that both Dx and Dy satisfy the above conditions.

When the surface-emitting device 20 of the surface light emitter of the embodiment 2 is activated to emit light, the light outputted from the output surface 14 of the light control sheet 10B is significantly increased in the front brightness as viewed from the front and from the range of ±15° from the front, just as in the surface light emitter of the embodiment 1. Thus, the surface light emitter of this embodiment achieves roughly a more than 1.6-fold increase in the front brightness as compared with the case where the light control sheet 10B is not provided.

In the case where the surface-emitting device 20 was activated to emit light as described above, the front brightness of the light outputted from the output surface 14 of the light control sheet 10B was examined. In FIG. 7, a gray area represents a zone s1 where the planar portion 12a at the distal end of the projection 12 is bonded, a white area represents a zone s2 having a higher front brightness than the zone s1 where the planar portion 12a is bonded, and a black area represents a zone s3 having a lower front brightness than the zone s1 where the planar portion 12a is bonded.

The surface light emitter of the embodiment 2 was also examined for a relation among the luminous area S0 of the surface-emitting device 20, namely the area of the output surface 21a of the surface-emitting device 20; the area S1 of the zones where the planar portions 12a of the projections 12 were bonded to the output surface 21a of the surface-emitting device 20, namely the total area of the gray zones s1 shown in FIG. 7; and the area S2 of the zones having the higher front brightness than the planar portion 12a of the projection 12 bonded to the output surface 21a, namely the total area of the white zones s2 shown in FIG. 7. Similarly to that of the embodiment 1, this surface light emitter satisfied the condition 0.04S0<S1<1.4S2.

In the light control sheet 10B employed by the surface light emitter of the embodiment 2, the apex angle θ1 of the isosceles trapezoidal cross-section of the projection 12 in the x-direction may be the same as the apex angle θ2 of the isosceles trapezoidal cross-section of the projection 12 in the y-direction or these apex angles may be different from each other.

It is also possible to use, as the light control sheet 10B, a light control sheet (not shown) wherein the truncated-pyramid shaped projections 12 formed with the rectangular planar portions 12a at the distal ends thereof are formed on the one side of the transparent substrate 11 as arranged in the x-direction and the y-direction thereof at required space intervals.

Embodiment 3

In a surface light emitter of an embodiment 3, a light control sheet 10C is used as the light control sheet. As shown in FIG. 8A to FIG. 8C, the light control sheet has a configuration wherein the projections 12 shaped like a truncated rectangular pyramid and formed with rectangular planar portions 12a at the distal ends thereof are consecutively formed on the one side of the transparent substrate 11 as arranged in the x-direction and the y-direction thereof. The above projection 12 is configured such that the cross-sectional profiles thereof in the x-direction and in the y-direction of the transparent substrate 11 are isosceles trapezoids which have different heights and shapes.

Similarly to the surface light emitter of the embodiment 1, the surface light emitter of the embodiment 3 is also assembled such that the planar portions 12a at the distal ends of the truncated-pyramid shaped projections 12 of the above light control sheet 10C are optically bonded to the output surface 21a of the transparent substrate 21 from which surface the light emitted by the surface-emitting device 20 is outputted.

In the surface light emitter of the embodiment 3, the light control sheet 10C is designed similarly to that of the surface light emitter of the embodiment 2 in the following point. It is provided that θ1 represents the apex angle of the isosceles trapezoidal cross-section of the projection 12 in the x-direction of the light control sheet 10C; θ2 represents the apex angle of the isosceles trapezoidal cross-section of the projection 12 in the y-direction thereof; and n represents the refractive index of the light control sheet 10B. The light control sheet 10C has a ratio Dx of the x-length of the zone where the planar portion 12a at the distal end thereof is bonded to the output surface 21a of the surface-emitting device 20, the x-length determined in the x-direction of the light control sheet 10C. The light control sheet 10C has a ratio Dy of the y-length of the zone where the planar portion 12a at the distal end thereof is bonded to the output surface 21a of the surface-emitting device 20, the y-length determined in the y-direction of the light control sheet 10C. At least one of the ratios Dx and DY satisfies the condition $0.75 > Dx > 4[(\sin \theta 1 - 1/n)^2 + 0.034]$ or $0.75 > Dy > 4[(\sin \theta 2 - 1/n)^2 + 0.034]$. As a matter of course, the light control sheet 10C may also be designed such that both Dx and Dy satisfy the above conditions.

When the surface-emitting device 20 of the surface light emitter of the embodiment 3 is activated to emit light, the light outputted from the output surface 14 of the light control sheet 10C is significantly increased in the front brightness as viewed from the front and from the range of ±15° from the front, just as in the surface light emitters of the above embodiments 1, 2. Thus, the surface light emitter of this embodiment achieves roughly a more than 1.6-fold increase in the front brightness as compared with the case where the light control sheet 10C is not provided.

In the case where the surface-emitting device 20 was activated to emit light as described above, the front brightness of the light outputted from the output surface 14 of the light control sheet 10C was examined. A distribution of the zones s1 where the planar portions 21a at the distal ends of the projections 12 were bonded, the zones s2 having the higher front brightness than the zone s1 where the planar portion 12a was bonded, and the zones s3 having the lower front brightness than the zone s1 where the planar portion 12a was bonded was substantially the same as that of the above embodiment 2. A relation among the luminous area S0 of the surface-emitting device 20, the area S1 of the zones where the planar portions 12a of the projections 12 were bonded to the output surface 21a of the surface-emitting device 20, and the area S2 of the zones having the higher front brightness than the planar portions 12a of the projections 12 bonded to the output surface 21a satisfied the condition $0.04 S0 < S1 < 1.4 S2$ similarly to the light control sheets of the above embodiments 1, 2.

Similarly to the light control sheet 10B employed by the surface light emitter of the embodiment 2, the light control sheet 10C employed by the surface light emitter of the embodiment 3 may be configured such that the apex angle θ1 of the isosceles trapezoidal cross-section of the projection 12 in the x-direction is the same as the apex angle θ2 of the isosceles trapezoidal cross-section of the projection 12 in the y-direction or that these apex angles are different from each other.

Embodiment 4

In a surface light emitter of an embodiment 4, a light control sheet 10D is used as the light control sheet. As shown in FIG. 9A and FIG. 9B, the light control sheet has a configuration wherein truncated-cone shaped projections 12 formed with circular planar portions 12a at the distal ends thereof and having the same cross-sectional profiles of isosceles trapezoid in the x-direction and y-direction are consecutively formed on the one side of the transparent substrate 11. The projections are in mutually contacting relation in the x-direction and y-direction of the transparent substrate 11.

Similarly to the surface light emitter of the embodiment 1, the surface light emitter of the embodiment 4 is also assembled such that the planar portions 12a at the distal ends of the truncated-cone shaped projections 12 of the above light control sheet 10D are optically bonded to the output surface 21a of the transparent substrate 21 from which surface the light emitted by the surface-emitting device 20 is outputted.

In the surface light emitter of the embodiment 4, the light control sheet 10D is also designed to satisfy the following conditions. Provided that θ represents the apex angle of the projection 12 of the light control sheet 10D and n represents the refractive index of the light control sheet 10D, a ratio Dx of the x-length of a zone where the planar portion 12a at the distal end of the projection 12 is bonded to the output surface 21a of the surface-emitting device 20 satisfies the condition $0.75 > Dx > 4[(\sin \theta - 1/n)^2 + 0.034]$, the x-length determined in the x-direction of the light control sheet 10D. Further, a ratio Dy of the y-length of the zone where the planar portion 12a at the distal end of the projection 12 is bonded to the output surface 21a of the surface-emitting device 20 satisfies the condition $0.75 > Dy > 4[(\sin \theta - 1/n)^2 + 0.034]$, the y-length determined in the y-direction of the light control sheet 10D.

When the surface-emitting device 20 of the surface light emitter of the embodiment 4 is activated to emit light, the light outputted from the output surface 14 of the light control sheet 10D is significantly increased in the front brightness as viewed from the front and from the range of ±15° from the front, just as in the surface light emitters of the above embodiments 1 to 3. Thus, the surface light emitter of this embodiment achieves roughly a more than 1.6-fold increase in the front brightness as compared with the case where the light control sheet 10D is not provided.

In the case where the surface-emitting device 20 was activated to emit light as described above, the front brightness of the light outputted from the output surface 14 of the light control sheet 10D was examined. In FIG. 10, a gray area represents a zone s1 where the planar portion 12a at the distal end of the projection 12 is bonded, a white area represents a zone s2 having a higher front brightness than the zone s1 where the planar portion 12a is bonded, and a black area represents a zone s3 having a lower front brightness than the zone s1 where the planar portion 12a is bonded.

The surface light emitter of the embodiment 4 was also examined for a relation among the luminous area S0 of the surface-emitting device 20, namely the area of the output surface 21a of the surface-emitting device 20; the area S1 of the zones where the planar portions 12a of the projections 12 were bonded to the output surface 21a of the surface-emitting device 20, namely the total area of the gray zones s1 shown in FIG. 10; and the area S2 of the zones having the higher front brightness than the planar portion 12a of the projection 12 bonded to the output surface 21a, namely the total area of the white zones s2 shown in FIG. 10. Similarly to those of the embodiments 1 to 3, this surface light emitter satisfied the condition 0.04S0<S1<1.4S2.

The surface light emitter of the embodiment 4 employs the light control sheet 10D wherein the truncated-cone shaped projections 12 formed with the circular planar portions at the distal ends thereof are consecutively formed on the one side of the transparent substrate 11 in the x-direction and y-direction thereof and in the mutually contacting relation. It is also possible to use a light control sheet 10D' wherein the truncated-cone shaped projections 12 having the circular planar portions 12a are formed on the one side of the transparent substrate 11 as arranged in the x-direction and y-direction thereof at required space intervals, as shown in FIG. 11A and FIG. 11B.

Embodiment 5

In a surface light emitter of an embodiment 5, a light control sheet 10E is used as the light control sheet. As shown in FIG. 12A and FIG. 12B, the light control sheet has a configuration wherein truncated-cone shaped projections formed with circular planar portions 12a at the distal ends thereof, having the same cross-sectional profiles of isosceles trapezoid in the x-direction and y-direction and having the respective circumferential bases thereof cut into a square are consecutively formed on the one side of the transparent substrate 11 as arranged in the x-direction and y-direction thereof.

Similarly to the surface light emitter of the embodiment 1, the surface light emitter of the embodiment 5 is also assembled such that the planar portions 12a at the distal ends of the truncated-cone shaped projections 12 of the above light control sheet 10E are optically bonded to the output surface 21a of the transparent substrate 21 from which surface the light emitted by the surface-emitting device 20 is outputted.

In the surface light emitter of the embodiment 5, the light control sheet 10E is also designed to satisfy the following conditions. Provided that $\theta$ represents the apex angle of the projection 12 of the light control sheet 10E and n represents the refractive index of the light control sheet 10E, a ratio Dx of the x-length of a zone where the planar portion 12a at the distal end of the projection 12 is bonded to the output surface 21a of the surface-emitting device 20 satisfies the condition $0.75>Dx>4[(\sin \theta-1/n)^2+0.034]$, the x-length determined in the x-direction of the light control sheet 10E. Further, a ratio Dy of the y-length of the zone where the planar portion 12a at the distal end of the projection 12 is bonded to the output surface 21a of the surface-emitting device 20 satisfies the condition $0.75>Dy>4[(\sin \theta-1/n)^2+0.034]$, the y-length determined in the y-direction of the light control sheet 10E.

When the surface-emitting device 20 of the surface light emitter of the embodiment 5 is activated to emit light, the light outputted from the output surface 14 of the light control sheet 10E is significantly increased in the front brightness as viewed from the front and from the range of ±15° from the front, just as in the surface light emitters of the above embodiments 1 to 4. Thus, the surface light emitter of this embodiment achieves roughly a more than 1.6-fold increase in the front brightness as compared with the case where the light control sheet 10E is not provided.

In the case where the surface-emitting device 20 was activated to emit light as described above, the front brightness of the light outputted from the output surface 14 of the light control sheet 10E was examined. In FIG. 13, a gray area represents a zone s1 where the planar portion 12a at the distal end of the projection 12 is bonded, and a white area represents a zone s2 having a higher front brightness than the zone s1 where the planar portion 12a is bonded. In the case where the light control sheet 10E was used, there was observed no zone having a lower front brightness than the zone s1 where the planar portion 12a was bonded.

The surface light emitter of the embodiment 5 was also examined for a relation among the luminous area S0 of the surface-emitting device 20, namely the area of the output surface 21a of the surface-emitting device 20; the area S1 of the zones where the planar portions 12a of the projections 12 were bonded to the output surface 21a of the surface-emitting device 20, namely the total area of the gray zones s1 shown in FIG. 13; and the area S2 of the zones having the higher front brightness than the planar portion 12a of the projection 12 bonded to the output surface 21a, namely the total area of the white zones s2 shown in FIG. 13. Similarly to those of the embodiments 1 to 4, this surface light emitter satisfied the condition 0.04S0<S1<1.4S2.

Embodiment 6

In a surface light emitter of an embodiment 6, a light control sheet 10F is used as the light control sheet. As shown in FIG. 14A to FIG. 14C, the light control sheet has a configuration wherein truncated-cone shaped projections formed with circular planar portions 12a at the distal ends thereof, having the same cross-sectional profiles of isosceles trapezoid in the x-direction and y-direction and having the respective circumferential bases thereof cut into an equilateral hexagon are formed on the one side of the transparent substrate 11. The projections are arranged in a honeycomb fashion having the highest packaging density.

Similarly to the surface light emitter of the embodiment 1, the surface light emitter of the embodiment 6 is also assembled such that the planar portions 12a at the distal ends of the truncated-cone shaped projections 12 of the above light control sheet 10F are optically bonded to the output surface 21a of the transparent substrate 21 from which surface the light emitted by the surface-emitting device 20 is outputted.

In the surface light emitter of the embodiment 6, the light control sheet 10F is also designed to satisfy the following conditions. Provided that $\theta$ represents the apex angle of the projection 12 of the light control sheet 10F and n represents the refractive index of the light control sheet 10F, a ratio Dx of the x-length of a zone where the planar portion 12a at the distal end of the projection 12 is bonded to the output surface 21a of the surface-emitting device 20 satisfies the condition $0.75>Dx>4[(\sin \theta-1/n)^2+0.034]$, the x-length determined in the x-direction of the light control sheet 10F. Further, a ratio Dy of the y-length of the zone where the planar portion 12a at the distal end of the projection 12 is bonded to the output surface 21a of the surface-emitting device 20 satisfies the condition $0.75>Dy>4[(\sin \theta-1/n)^2+0.034]$, the y-length determined in the y-direction of the light control sheet 10F.

When the surface-emitting device 20 of the surface light emitter of the embodiment 6 is activated to emit light, the light outputted from the output surface 14 of the light control sheet 10F is significantly increased in the front brightness as viewed from the front and from the range of ±15° from the front, just as in the surface light emitters of the above embodiments 1 to 5. Thus, the surface light emitter of this embodiment achieves roughly a more than 1.6-fold increase in the front brightness as compared with the case where the light control sheet 10F is not provided.

In the case where the surface-emitting device 20 was activated to emit light as described above, the front brightness of the light outputted from the output surface 14 of the light control sheet 10F was examined. In FIG. 15, a gray area represents a zone s1 where the planar portion 12a at the distal end of the projection 12 is bonded, a white area represents a zone s2 having a higher front brightness than the zone s1 where the planar portion 12a is bonded, and a black area represents a zone s3 having a lower front brightness than the zone s1 where the planar portion 12a is bonded.

The surface light emitter of the embodiment 6 was also examined for a relation among the luminous area S0 of the surface-emitting device 20, namely the area of the output surface 21a of the surface-emitting device 20; the area S1 of the zones where the planar portions 12a of the projections 12 were bonded to the output surface 21a of the surface-emitting device 20, namely the total area of the gray zones s1 shown in FIG. 15; and the area S2 of the zones having the higher front brightness than the planar portion 12a of the projection 12 bonded to the output surface 21a, namely the total area of the white zones s2 shown in FIG. 15. Similarly to those of the embodiments 1 to 5, this surface light emitter satisfied the condition 0.04S0<S1<1.4S2.

Embodiment 7

In a surface light emitter of an embodiment 7, a light control sheet 10G is used as the light control sheet. As shown in FIG. 16A and FIG. 16B, the light control sheet has a configuration wherein recesses 15 defined by an inverted pyramid are formed on the one side of the transparent substrate 11 as arranged in the x-direction and y-direction thereof at required space intervals while projections 12 having the same cross-sectional profiles of isosceles trapezoid in the x-direction and y-direction thereof are consecutively formed on the one side of the transparent substrate as arranged in the x-direction and y-direction thereof.

Similarly to the surface light emitter of the embodiment 1, the surface light emitter of the embodiment 7 is also assembled such that the planar portions 12a at the distal ends of the projections 12 on the area of the transparent substrate 11 of the above light control sheet 10G, the area free from the recesses 15, are optically bonded to the output surface 21a of the transparent substrate 21 from which surface the light emitted by the surface-emitting device 20 is outputted.

In the surface light emitter of the embodiment 7, the light control sheet 10G is also designed to satisfy the following conditions. Provided that θ represents the apex angle of the projection 12 of the light control sheet 10G and n represents the refractive index of the light control sheet 10G, a ratio Dx of the x-length of a zone where the planar portion 12a at the distal end of the projection 12 is bonded to the output surface 21a of the surface-emitting device 20 satisfies the condition $0.75 > Dx > 4[(\sin \theta - 1/n)^2 + 0.034]$, the x-length determined in the x-direction of the light control sheet 10G. Further, a ratio Dy of the y-length of the zone where the planar portion 12a at the distal end of the projection 12 is bonded to the output surface 21a of the surface-emitting device 20 satisfies the condition $0.75 > Dy > 4[(\sin \theta - 1/n)^2 + 0.034]$, the y-length determined in the y-direction of the light control sheet 10G.

When the surface-emitting device 20 of the surface light emitter of the embodiment 7 is activated to emit light, the light outputted from the output surface 14 of the light control sheet 10G is significantly increased in the front brightness as viewed from the front and from the range of ±15° from the front, just as in the surface light emitters of the above embodiments 1 to 6. Thus, the surface light emitter of this embodiment achieves roughly a more than 1.6-fold increase in the front brightness as compared with the case where the light control sheet 10G is not provided.

In the case where the surface-emitting device 20 was activated to emit light as described above, the front brightness of the light outputted from the output surface 14 of the light control sheet 10G was examined. In FIG. 17, a gray area represents a zone s1 where the planar portion 12a at the distal end of the projection 12 is bonded, and a white area represents a zone s2 having a higher front brightness than the zone s1 where the planar portion 12a is bonded. In the case where the light control sheet 10G was used, there was observed no zone having a lower front brightness than the zone s1 where the planar portion 12a was bonded.

The surface light emitter of the embodiment 6 was also examined for a relation among the luminous area S0 of the surface-emitting device 20, namely the area of the output surface 21a of the surface-emitting device 20; the area S1 of the zones where the planar portions 12a of the projections 12 were bonded to the output surface 21a of the surface-emitting device 20, namely the total area of the gray zones s1 shown in FIG. 17; and the area S2 of the zones having the higher front brightness than the planar portion 12a of the projection 12 bonded to the output surface 21a, namely the total area of the white zones s2 shown in FIG. 17. Similarly to those of the embodiments 1 to 6, this surface light emitter satisfied the condition 0.04S0<S1<1.4S2.

EXAMPLES

Next, surface light emitters according to examples of the invention are compared with those of comparative examples so as to demonstrate that the surface light emitters according to the examples of the invention are notably improved in the front brightness of the light outputted therefrom.

Comparative Example 1

In a surface light emitter of a comparative example 1, a surface-emitting device 20 was used as it was, omitting the light control sheet.

The surface-emitting device 20 employed by the comparative example comprised the organic EL device, as illustrated by the embodiment 1 above, wherein the organic EL layer 23 and the counter electrode 24 were overlaid on the surface of the transparent substrate 22 on which surface the transparent electrode 22 was overlaid. The transparent substrate 21 of this surface-emitting device 20 had a refractive index of 1.517 for light having a wavelength of 550 nm.

The surface-emitting device 20 was activated to emit light to examine the luminous intensity distribution characteristic of the light outputted from the output surface 21a of the transparent substrate 21. The result is shown in FIG. 18 in which the maximum front brightness of the light outputted from the output surface 21a and viewed from the range of ±15° from the front is expressed as 1.

Examples 1 to 6 and Comparative Examples 2, 3

In surface light emitters of examples 1 to 6 and comparative examples 2, 3, the same surface-emitting device 20 as that of the comparative example 1 and the light control sheet 10A illustrated by the embodiment 1 were used. The light control sheet 10A had a thickness of 120 μm and a refractive index of 1.495 for light having a wavelength of 550 nm.

In the examples 1 to 6 and comparative examples 2, 3, as listed in the following table 1, the projections 12 of each light control sheet 10A had the x-pitch and the y-pitch set to 40.0

μm and the apex angle θ set to 50°. On the other hand, the projections 12 formed on the light control sheet 10A were varied in the height and the like, whereby in the x-direction and y-direction of the arrangement of the projections 12, the ratio D (Dx, Dy) of the length of the zone where the projection was tightly bonded to the output surface 21 of the surface-emitting device 20 was varied, and whereby the ratio S1/S0 of the area S1 of the projections 12 tightly bonded to the output surface 21a of the surface-emitting device 20 to the luminous area S0 of the surface-emitting device 20 was varied. The length ratio D and the area ratio S1/S0 were varied as listed in the table 1. Each light control sheet 10A had a value $Z=4[(\sin \theta-1/n)^2+0.034]$ at 0.1738.

In each of the surface light emitters of the examples 1 to 6 and comparative examples 2, 3, the above surface-emitting device 20 was activated to emit light so as to examine the luminous intensity distribution characteristic of the light outputted from the output surface 14 of each light control sheet 10A. FIG. 19 shows the result of the example 1, FIG. 20 showing the result of the example 2, FIG. 21 showing the result of the example 3, FIG. 22 showing the result of the example 4, FIG. 23 showing the result of the example 5, FIG. 24 showing the result of the example 6, FIG. 25 showing the result of the comparative example 2, FIG. 26 showing the result of the comparative example 3. For each of the light control sheets 10A, the maximum front brightness of the light outputted from the output surface 14 thereof and viewed from the range of ±15° from the front was determined in terms of relative brightness based on the maximum front brightness of the above comparative example 1 defined as 1. The results are shown in FIG. 19 to FIG. 26 and in the following table 1.

Further, each of the light control sheets 10A was examined for the front brightness of the light outputted from the output surface 14 thereof so as to determine the area S2 of the zones having the higher front brightness than that of the zones where the projections were tightly bonded to the output surface. The respective values of S1/S2 were calculated. The results are listed in the following table 1.

In the surface light emitters of the comparative examples 2, 3 which did not satisfy the condition $0.75>D>4[(\sin \theta-1/n)^2+0.034]$ nor $0.04S0<S1<1.4S2$, on the other hand, the respective increase of the maximum front brightness was less than those of the surface light emitters of the examples 1 to 6, although the respective maximum front brightness was higher than that of the surface light emitter of the comparative example 1.

Examples 7, 8

In surface light emitters of examples 7, 8, the same surface-emitting device 20 as that of the comparative example 1 and the light control sheet 10B illustrated by the embodiment 2 were used. The light control sheet 10B had a thickness of 120 μm and a refractive index of 1.495 for light having a wavelength of 550 nm.

In the examples 7 and 8, as listed in the following table 2, the projections 12 of each light control sheet 10B had the apex angle θ of the isosceles trapezoidal cross-section in the x-direction thereof and the apex angle of the isosceles trapezoidal cross-section in the y-direction thereof set to 50°. On the other hand, the projections 12 formed on the light control sheet 10B were varied in the x-pitch and y-pitch thereof, whereby in the x-direction and y-direction of the arrangement of the projections 12, the ratio D (Dx, Dy) of the length of the zone where the projection 12 was tightly bonded to the output surface 21a of the surface-emitting device 20 was varied, and whereby the ratio S1/S0 of the area S1 of the projections 12 tightly bonded to the output surface 21a of the surface-emitting device 20 to the luminous area S0 of the surface-emitting device 20 was varied. The length ratio D and the area ratio S1/S0 were varied as listed in the table 2. Each of the light control sheets 10B had a value $Z=4[(\sin \theta-1/n)^2+0.034]$ at 0.1738.

In each of the surface light emitters of the examples 7, 8, the above surface-emitting device 20 was activated to emit light so as to examine the luminous intensity distribution characteristic of the light outputted from the output surface 14 of the

TABLE 1

| | Light control sheet | Pitch between projections (μm) | | θ | Dx | Dy | Z | S1/S0 | S2 (%) | S1/S2 | Maximum front brightness |
|---|---|---|---|---|---|---|---|---|---|---|---|
| | | x-direction | y-direction | | | | | | | | |
| Ex. 1 | 10A | 40.0 | 40.0 | 50° | 0.590 | 0.590 | 0.1738 | 0.348 | 48.4 | 0.72 | 1.70 |
| Ex. 2 | 10A | 40.0 | 40.0 | 50° | 0.683 | 0.683 | 0.1738 | 0.466 | 43.3 | 1.08 | 1.63 |
| Ex. 3 | 10A | 40.0 | 40.0 | 50° | 0.347 | 0.347 | 0.1738 | 0.121 | 45.3 | 0.27 | 1.93 |
| Ex. 4 | 10A | 40.0 | 40.0 | 50° | 0.273 | 0.273 | 0.1738 | 0.074 | 39.7 | 0.19 | 1.67 |
| Ex. 5 | 10A | 40.0 | 40.0 | 50° | 0.384 | 0.384 | 0.1738 | 0.148 | 47.3 | 0.31 | 1.78 |
| Ex. 6 | 10A | 40.0 | 40.0 | 50° | 0.310 | 0.310 | 0.1738 | 0.096 | 42.8 | 0.22 | 1.93 |
| Comp. Ex. 2 | 10A | 40.0 | 40.0 | 50° | 0.776 | 0.776 | 0.1738 | 0.602 | 34.7 | 1.73 | 1.40 |
| Comp. Ex. 3 | 10A | 40.0 | 40.0 | 50° | 0.105 | 0.776 | 0.1738 | 0.011 | 18.7 | 0.08 | 1.48 |

Note:
$Z = 4[(\sin\theta - 1/n)^2 + 0.034]$

According to the results, the surface light emitters of the examples 1 to 6 satisfied the conditions specified by the invention, $0.75>D>4[(\sin \theta-1/n)^2+0.034]$ and $0.04S0<S1<1.4S2$. In each of the surface light emitters, the maximum front brightness of the light outputted from the output surface 14 of the light control sheet 10A and viewed from the range of ±15° from the front was more than 1.6 times the maximum front brightness of the light outputted from the output surface 21a of the surface light emitter of the comparative example 1.

light control sheet 10B. FIG. 27 shows the result of the example 7 and FIG. 28 shows the result of the example 8. For each of the light control sheets 10B, the maximum front brightness of the light outputted from the output surface 14 thereof and viewed from the range of ±15° from the front was determined in terms of relative brightness based on the maximum front brightness of the above comparative example 1 defined as 1. The results are shown in FIG. 27 and FIG. 28 and in the following table 2. In FIG. 27 and FIG. 28, the solid line represents the luminous intensity distribution characteristic in the x-direction and the broken line represents the luminous intensity distribution characteristic in the y-direction.

Further, each of the light control sheets 10B was examined for the front brightness of the light outputted from the output surface 14 thereof so as to determine the area S2 of the zones having the higher front brightness than that of the zones where the projections were tightly bonded to the output surface. The respective values of S1/S2 were calculated. The results are listed in the following table 2.

TABLE 2

| Light control sheet | Pitch between projections (μm) | | $\theta 1 = \theta 2$ | D | | | S1/S0 | S2 (%) | S1/S2 | Maximum front brightness |
|---|---|---|---|---|---|---|---|---|---|---|
| | x-direction | y-direction | | Dx | Dy | Z | | | | |
| Ex. 7 | 10B | 87.2 | 40.0 | 50° | 0.683 | 0.310 | 0.1738 | 0.212 | 57.0 | 0.37 | 1.93 |
| Ex. 8 | 10B | 18.4 | 40.0 | 50° | 0.311 | 0.683 | 0.1738 | 0.212 | 56.9 | 0.37 | 1.85 |

Note:
$Z = 4[(\sin\theta - 1/n)^2 + 0.034]$

According to the results, the surface light emitters of the examples 7 and 8 also satisfied the conditions specified by the invention, $0.75 > D > 4[(\sin \theta - 1/n)^2 + 0.034]$ and $0.04 S0 < S1 < 1.4 S2$. In each of the surface light emitters, the maximum front brightness of the light outputted from the output surface 14 of the light control sheet 10B and viewed from the range of ±15° from the front was more than 1.6 times the maximum front brightness of the light outputted from the output surface 21a of the surface light emitter of the comparative example 1.

Examples 9 to 13 and Comparative Example 4

In surface light emitters of examples 9 to 13 and comparative example 4, the same surface-emitting device 20 as that of the comparative example 1 and the light control sheet 10C illustrated by the embodiment 3 were used. The light control sheet 10C had a thickness of 120 μm and a refractive index of 1.495 for light having a wavelength of 550 nm.

In the examples 9 to 13 and comparative example 4, as listed in the following table 3, the projections 12 of each light control sheet 10C had the x-pitch and the y-pitch set to 40.0 μm and the apex angle θ of the isosceles trapezoidal cross-section in the x-direction and the apex angle θ of the isosceles trapezoidal cross-section in the y-direction set to 50°. On the other hand, the projections 12 formed on the light control sheet 10C were adjusted in the heights in the cross-sections in the x-direction and y-direction, whereby in the x-direction and y-direction of the arrangement of the projections 12, the ratio D (Dx, Dy) of the length of the zone where the projection 12 was tightly bonded to the output surface 21a of the surface-emitting device 20 was varied, and whereby the ratio S1/S0 of the area S1 of the projections 12 tightly bonded to the output surface 21a of the surface-emitting device 20 to the luminous area S0 of the surface-emitting device 20 was varied. The length ratio D and the area ratio S1/S0 were varied as listed in the table 3. Each of the light control sheets 10C had a value $Z = 4[(\sin\theta - 1/n)^2 + 0.034]$ at 0.1738.

In each of the surface light emitters of the examples 9 to 13 and comparative examples 4, the above surface-emitting device 20 was activated to emit light so as to examine the luminous intensity distribution characteristic of the light outputted from the output surface 14 of the light control sheet 10C. FIG. 29 shows the result of the example 9, FIG. 30 showing the result of the example 10, FIG. 31 showing the result of the example 11, FIG. 32 showing the result of the example 12, FIG. 33 showing the result of the example 13, FIG. 34 showing the result of the comparative example 4. For each of the light control sheets 10C, the maximum front brightness of the light outputted from the output surface 14 thereof and viewed from the range of ±15° from the front was determined in terms of relative brightness based on the maximum front brightness of the above comparative example 1 defined as 1. The results are shown in FIG. 29 to FIG. 34 and in the following table 3. In FIG. 29 to FIG. 34, the solid line represents the luminous intensity distribution characteristic in the x-direction and the broken line represents the luminous intensity distribution characteristic in the y-direction.

Further, each of the light control sheets 10C was examined for the front brightness of the light outputted from the output surface 14 thereof so as to determine the area S2 of the zones having the higher front brightness than that of the zones where the projections were tightly bonded to the output surface. The respective values of S1/S2 were calculated. The results are listed in the following table 3.

TABLE 3

| | Light control sheet | Pitch between projections (μm) | | $\theta 1 = \theta 2$ | D | | | S1/S0 | S2 (%) | S1/S2 | Maximum front brightness |
|---|---|---|---|---|---|---|---|---|---|---|---|
| | | x-direction | y-direction | | Dx | Dy | Z | | | | |
| Ex. 9 | 10C | 40.0 | 40.0 | 50° | 0.683 | 0.310 | 0.1738 | 0.212 | 57.0 | 0.37 | 1.93 |
| Ex. 10 | 10C | 40.0 | 40.0 | 50° | 0.784 | 0.310 | 0.1738 | 0.243 | 60.8 | 0.40 | 1.93 |
| Ex. 11 | 10C | 40.0 | 40.0 | 50° | 0.882 | 0.310 | 0.1738 | 0.273 | 64.5 | 0.42 | 1.78 |
| Ex. 12 | 10C | 40.0 | 40.0 | 50° | 0.821 | 0.347 | 0.1738 | 0.285 | 59.8 | 0.48 | 1.89 |

TABLE 3-continued

| Light control sheet | Pitch between projections (μm) | | θ1 = θ2 | D | | | S1/S0 | S2 (%) | S1/S2 | Maximum front brightness |
|---|---|---|---|---|---|---|---|---|---|---|
| | x-direction | y-direction | | Dx | Dy | Z | | | | |
| Ex. 13 | 10C | 40.0 | 40.0 | 50° | 0.746 | 0.273 | 0.1738 | 0.203 | 61.2 | 0.33 | 1.96 |
| Comp. Ex. 4 | 10C | 40.0 | 40.0 | 50° | 0.882 | 0.776 | 0.1738 | 0.685 | 28.9 | 2.37 | 1.40 |

Note:
$Z = 4[(\sin\theta - 1/n)^2 + 0.034]$

According to the results, the surface light emitters of the examples 9 to 13 satisfied the conditions specified by the invention, $0.75 > D > 4[(\sin\theta - 1/n)^2 + 0.034]$ and $0.04S0 < S1 < 1.4S2$. In each of the surface light emitters, the maximum front brightness of the light outputted from the output surface 14 of the light control sheet 10C and viewed from the range of ±15° from the front was more than 1.6 times the maximum front brightness of the light outputted from the output surface 21a of the surface light emitter of the comparative example 1.

In the surface light emitter of the comparative example 4 which did not satisfy the condition $0.75 > D > 4[(\sin\theta - 1/n)^2 + 0.034]$ nor $0.04S0 < S1 < 1.4S2$, on the other hand, the increase of the maximum front brightness was less than those of the surface light emitters of the examples 9 to 13, although the maximum front brightness was higher than that of the surface light emitter of the comparative example 1.

In the surface light emitter of the example 14, the above surface-emitting device 20 was activated to emit light so as to examine the luminous intensity distribution characteristic of the light outputted from the output surface 14 of the light control sheet 10D. The result is shown in FIG. 35. For the light control sheet 10D, the maximum front brightness of the light outputted from the output surface 14 thereof and viewed from the range of ±15° from the front was determined in terms of relative brightness based on the maximum front brightness of the above comparative example 1 defined as 1. The result is shown in FIG. 35 and in the following table 4.

Further, the light control sheet 10D was examined for the front brightness of the light outputted from the output surface 14 thereof so as to determine the area S2 of the zones having the higher front brightness than that of the zones where the projections were tightly bonded to the output surface. The value of S1/S2 was calculated. The result is shown in the following table 4.

TABLE 4

| Light control sheet | Pitch between projections (μm) | | θ | D | | | S1/S0 | S2 (%) | S1/S2 | Maximum front brightness |
|---|---|---|---|---|---|---|---|---|---|---|
| | x-direction | y-direction | | Dx | Dy | Z | | | | |
| Ex. 14 | 10D | 40.0 | 40.0 | 50° | 0.384 | 0.384 | 0.1738 | 0.116 | 66.9 | 0.17 | 2.11 |

Note:
$Z = 4[(\sin\theta - 1/n)^2 + 0.034]$

Example 14

In a surface light emitter of an example 14, the same surface-emitting device 20 as that of the comparative example 1 and the light control sheet 10D illustrated by the embodiment 4 were used. The light control sheet 10D had a thickness of 120 μm and a refractive index of 1.495 for light having a wavelength of 550 nm.

In the example 14, as listed in the following table 4, the projections 12 of the light control sheet 10D had the apex angle θ set to 50° and the x-pitch and y-pitch set to 40 μm. Further, in the x-direction and y-direction of the arrangement of the projections 12, the ratio D (Dx, Dy) of the length of the zone where the projection 12 was tightly bonded to the output surface 21a of the surface-emitting device 20 was adjusted to 0.384, while the ratio S1/S0 of the area S1 of the projections 12 tightly bonded to the output surface 21a of the surface-emitting device 20 to the luminous area S0 of the surface-emitting device 20 was adjusted to 0.116. The light control sheet 10D had a value $Z = 4[(\sin\theta - 1/n)^2 + 0.034]$ at 0.1738.

According to the result, the surface light emitter of the example 14 also satisfied the conditions specified by the invention, $0.75 > D > 4[(\sin\theta - 1/n)^2 + 0.034]$ and $0.04S0 < S1 < 1.4S2$. In the surface light emitter, the maximum front brightness of the light outputted from the output surface 14 of the light control sheet 10D and viewed from the range of ±15° from the front was more than 1.6 times the maximum front brightness of the light outputted from the output surface 21a of the surface light emitter of the comparative example 1.

Example 15 to 17

In surface light emitters of examples 15 to 17, the same surface-emitting device 20 as that of the comparative example 1 and the light control sheet 10E illustrated by the embodiment 5 were used. The light control sheet 10E had a thickness of 120 μm and a refractive index of 1.495 for light having a wavelength of 550 nm.

In the examples 15 to 17, as listed in the following table 5, the projections 12 of each light control sheet 10E had the x-pitch and the y-pitch set to 40.0 μm and the apex angle θ set to 50°. On the other hand, the projections 12 formed on the light control sheet 10E were varied in the height and the like, whereby in the x-direction and y-direction of the arrangement of the projections 12, the ratio D (Dx, Dy) of the length of the zone where the projection 12 was tightly bonded to the output surface 21a of the surface-emitting device 20 was varied, and whereby the ratio S1/S0 of the area S1 of the projections 12 tightly bonded to the output surface 21a of the surface-emitting device 20 to the luminous area S0 of the surface-emitting device 20 was varied. The length ratio D and the area ratio S1/S0 were varied as listed in the table 5. Each of the light control sheets 10E had a value $Z=4[(\sin θ−1/n)^2+0.034]$ at 0.1738.

In each of the surface light emitters of the examples 15 to 17, the above surface-emitting device 20 was activated to emit light so as to examine the luminous intensity distribution characteristic of the light outputted from the output surface 14 of the light control sheet 10E. FIG. 36 shows the result of the example 15, FIG. 37 showing the result of the example 16, FIG. 38 showing the result of the example 17. For each of the light control sheets 10E, the maximum front brightness of the light outputted from the output surface 14 thereof and viewed from the range of ±15° from the front was determined in terms of relative brightness based on the maximum front brightness of the above comparative example 1 defined as 1. The results are shown in FIG. 36 to FIG. 38 and in the following table 5.

Further, each of the light control sheets 10E was examined for the front brightness of the light outputted from the output surface 14 thereof so as to determine the area S2 of the zones having the higher front brightness than that of the zones where the projections were tightly bonded to the output surface. The respective values of S1/S2 were calculated. The results are listed in the following table 5.

ment 6 were used. The light control sheet 10F had a thickness of 120 μm and a refractive index of 1.495 for light having a wavelength of 550 nm.

In the examples 18 to 21, the projections 12 of each light control sheet 10F were re-arranged as follows. As shown in the following table 6, the respective arrays of projections 12 having an x-pitch of 46.2 μm were shifted in the x-direction by ½ pitch whereby the projections were arranged in parallel in the y-direction. The respective arrays of projections 12 having a y-pitch of 80 μm were shifted in the y-direction by ½ pitch whereby the projections were arranged in parallel in the x-direction. The projections 12 had the apex angle θ set to 50°. On the other hand, the projections 12 formed on the light control sheet 10F were varied in the height and the like, whereby in the x-direction and y-direction of the arrangement of the projections 12, the ratio D (Dx, Dy) of the length of the zone where the projection 12 was tightly bonded to the output surface 21a of the surface-emitting device 20 was varied, and whereby the ratio S1/S0 of the area S1 of the projections 12 tightly bonded to the output surface 21a of the surface-emitting device 20 to the luminous area S0 of the surface-emitting device 20 was varied. The length ratio D and the area ratio S1/S0 were varied as listed in the table 6. Each of the light control sheets 10F had a value $Z=4[(\sin θ−1/n)^2+0.034]$ at 0.1738.

In each of the surface light emitters of the examples 18 to 21, the above surface-emitting device 20 was activated to emit light so as to examine the luminous intensity distribution characteristic of the light outputted from the output surface 14 of the light control sheet 10F. FIG. 39 shows the result of the

TABLE 5

| | Light control sheet | Pitch between projections (μm) | | | D | | | | S2 | | Maximum front |
|---|---|---|---|---|---|---|---|---|---|---|---|
| | | x-direction | y-direction | θ | Dx | Dy | Z | S1/S0 | (%) | S1/S2 | brightness |
| Ex. 15 | 10E | 40.0 | 40.0 | 50° | 0.384 | 0.384 | 0.1738 | 0.116 | 88.4 | 0.13 | 2.30 |
| Ex. 16 | 10E | 40.0 | 40.0 | 50° | 0.571 | 0.571 | 0.1738 | 0.256 | 74.4 | 0.34 | 2.19 |
| Ex. 17 | 10E | 40.0 | 40.0 | 50° | 0.478 | 0.478 | 0.1738 | 0.179 | 82.1 | 0.22 | 2.56 |

Note:
$Z = 4[(\sin θ − 1/n)^2 + 0.034]$

According to the results, the surface light emitters of the examples 15 to 17 also satisfied the conditions specified by the invention, $0.75>D>4[(\sin θ−1/n)^2+0.034]$ and $0.04S0<S1<1.4S2$. In each of the surface light emitters, the maximum front brightness of the light outputted from the output surface 14 of the light control sheet 10E and viewed from the range of ±15° from the front was more than 1.6 times the maximum front brightness of the light outputted from the output surface 21a of the surface light emitter of the comparative example 1.

Examples 18 to 21

In surface light emitters of examples 18 to 21, the same surface-emitting device 20 as that of the comparative example 1 and the light control sheet 10F illustrated by the embodiexample 18, FIG. 40 showing the result of the example 19, FIG. 41 showing the result of the example 20, FIG. 42 showing the result of the example 21. For each of the light control sheets 10F, the maximum front brightness of the light outputted from the output surface 14 thereof and viewed from the range of ±15° from the front was determined in terms of relative brightness based on the maximum front brightness of the above comparative example 1 defined as 1. The results are shown in FIG. 39 to FIG. 42 and in the following table 6.

Further, each of the light control sheets 10F was examined for the front brightness of the light outputted from the output surface 14 thereof so as to determine the area S2 of the zones having the higher front brightness than that of the zones where the projections were tightly bonded to the output surface. The respective values of S1/S2 were calculated. The results are listed in the following table 6.

TABLE 6

| Light control sheet | Pitch between projections (μm) x-direction | Pitch between projections (μm) y-direction | θ | Dx | Dy | Z | S1/S0 | S2 (%) | S1/S2 | Maximum front brightness |
|---|---|---|---|---|---|---|---|---|---|---|
| Ex. 18 | 10F | 46.2 | 80.0 | 50° | 0.402 | 0.402 | 0.1738 | 0.147 | 76.0 | 0.19 | 2.22 |
| Ex. 19 | 10F | 46.2 | 80.0 | 50° | 0.322 | 0.322 | 0.1738 | 0.094 | 81.3 | 0.12 | 2.37 |
| Ex. 20 | 10F | 46.2 | 80.0 | 50° | 0.241 | 0.241 | 0.1738 | 0.053 | 85.4 | 0.06 | 2.22 |
| Ex. 21 | 10F | 46.2 | 80.0 | 50° | 0.217 | 0.217 | 0.1738 | 0.043 | 86.5 | 0.05 | 2.03 |

Note:
$Z = 4[(\sin\theta - 1/n)^2 + 0.034]$

According to the results, the surface light emitters of the examples 18 to 21 also satisfied the conditions specified by the invention, $0.75 > D > 4[(\sin\theta - 1/n)^2 + 0.034]$ and $0.04 S0 < S1 < 1.4 S2$. In each of the surface light emitters, the maximum front brightness of the light outputted from the output surface 14 of the light control sheet 10F and viewed from the range of ±15° from the front was more than 1.6 times the maximum front brightness of the light outputted from the output surface 21a of the surface light emitter of the comparative example 1.

Examples 22 to 25

In surface light emitters of examples 22 to 25, the same surface-emitting device 20 as that of the comparative example 1 and the light control sheet 10G illustrated by the embodiment 6 were used. The light control sheet 10G had a thickness of 120 μm and a refractive index of 1.495 for light having a wavelength of 550 nm.

As listed in the following table 7, the projections 12 of the light control sheet 10G used in the example 22 had the apex angle θ set to 45° and the x-pitch and the y-pitch set to 40.0 μm. In the x-direction and y-direction of the arrangement of the projections 12, the ratio D (Dx, Dy) of the length of the zone where the projection 12 was tightly bonded to the output surface 21a of the surface-emitting device 20 was set to 0.345, while the ratio S1/S0 of the area S1 of the projections 12 tightly bonded to the output surface 21a of the surface-emitting device 20 to the luminous area S0 of the surface-emitting device 20 was set to 0.582. In the example 23, the projections 12 of the light control sheet 10G had the apex angle θ set to 50° and the x-pitch and the y-pitch set to 40.0 μm. In the x-direction and y-direction of the arrangement of the projections 12, the ratio D (Dx, Dy) of the length of the zone where the projection 12 was tightly bonded to the output surface 21a of the surface-emitting device 20 was set to 0.179, while the ratio S1/S0 of the area S1 of the projections 12 tightly bonded to the output surface 21a of the surface-emitting device 20 to the luminous area S0 of the surface-emitting device 20 was set to 0.326.

The light control sheet 10G of the example 22 had a value $Z = 4[(\sin\theta - 1/n)^2 + 0.034]$ at 0.1628. The light control sheet 10G of the example 23 had a value $Z = 4[(\sin\theta - 1/n)^2 + 0.034]$ at 0.1738.

In the surface light emitters of the examples 24, 25, only the thickness of the light control sheet 10G used in the surface light emitter of the above example 23 was varied. The thickness of the sheet was set to 35.2 μm in the example 24 and set to 32 μm in the example 25.

In a case where the inverted-pyramid shaped recesses as illustrated by the above embodiment 6 are formed in the light control sheet reduced in the thickness as illustrated by the examples 24, 25, the recesses 15 extend through the transparent substrate 11, as shown in FIG. 43. Thus is obtained a light control sheet 10G' wherein the inverted-pyramid shaped recesses 15 extend through the transparent substrate 11. The light control sheets 10G' of the example 24, 25 had a value $Z = 4[(\sin\theta - 1/n)^2 + 0.034]$ at 0.1738, which is the same as that of the light control sheet 10G of the example 23.

In each of the surface light emitters of the examples 22 to 25, the above surface-emitting device 20 was activated to emit light so as to examine the luminous intensity distribution characteristic of the light outputted from the output surface 14 of the light control sheet 10G, 10G'. FIG. 44 shows the result of the example 22, FIG. 45 showing the result of the example 23, FIG. 46 showing the result of the example 24, FIG. 47 showing the result of the example 25. For each of the light control sheets 10G, 10G', the maximum front brightness of the light outputted from the output surface 14 thereof and viewed from the range of ±15° from the front was determined in terms of relative brightness based on the maximum front brightness of the above comparative example 1 defined as 1. The results are shown in FIG. 44 to FIG. 47 and in the following table 7.

TABLE 7

| Light control sheet | Pitch between projections (μm) x-direction | Pitch between projections (μm) y-direction | θ | Dx | Dy | Z | S1/S0 | S2 (%) | S1/S2 | Maximum front brightness |
|---|---|---|---|---|---|---|---|---|---|---|
| Ex. 22 | 10G | 40.0 | 40.0 | 45° | 0.354 | 0.354 | 0.1628 | 0.582 | 41.8 | 1.39 | 1.59 |
| Ex. 23 | 10G | 40.0 | 40.0 | 50° | 0.179 | 0.179 | 0.1738 | 0.326 | 67.4 | 0.48 | 1.70 |

TABLE 7-continued

| Light control sheet | Pitch between projections (μm) | | | D | | | S1/S0 | S2 (%) | S1/S2 | Maximum front brightness |
|---|---|---|---|---|---|---|---|---|---|---|
| | x-direction | y-direction | θ | Dx | Dy | Z | | | | |
| Ex. 24 | 10G' | 40.0 | 40.0 | 50° | 0.179 | 0.179 | 0.1738 | 0.326 | 67.4 | 1.39 | 1.81 |
| Ex. 25 | 10G' | 40.0 | 40.0 | 50° | 0.179 | 0.179 | 0.1738 | 0.326 | 67.3 | 1.39 | 1.78 |

Note:
$Z = 4[(\sin\theta - 1/n)^2 + 0.034]$
Thickness of light control sheet:
Examples 22, 23 = 120 μm,
Example 24 = 35.2 μm,
Example 25 = 32 μm According to the results, the surface light emitters of the examples 22 to 25 also satisfied the conditions specified by the invention, $0.75 > D > 4[(\sin\theta - 1/n)^2 + 0.034]$ and $0.04 S0 < S1 < 1.4 S2$. In each of the surface light emitters, the maximum front brightness of the light outputted from the output surface 14 of the light control sheet 10G, 10G' and viewed from the range of ±15° from the front was more than 1.6 times the maximum front brightness of the light outputted from the output surface 21a of the surface light emitter of the comparative example 1.

Figure 1:
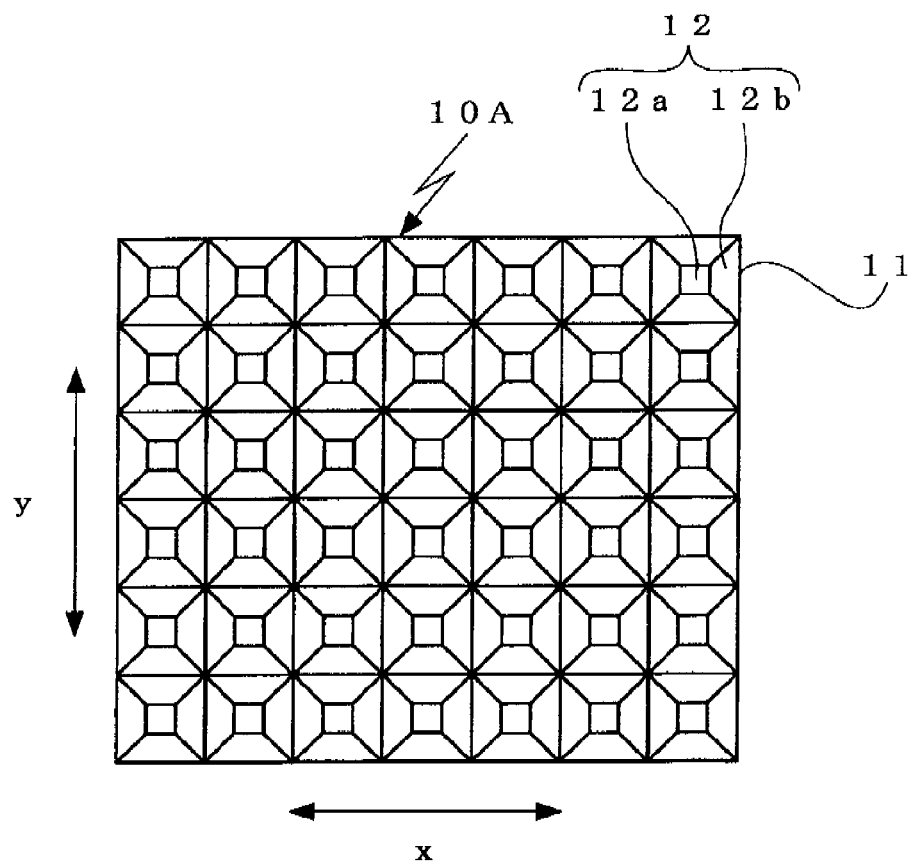
FIG. 1 shows a light control sheet used in a surface light emitter according to an embodiment 1 of the invention, including a schematic plan view of a side formed with projections and a schematic explanatory diagram of the arrangement of the projections in an x-direction of the light control sheet.
Figure 1:
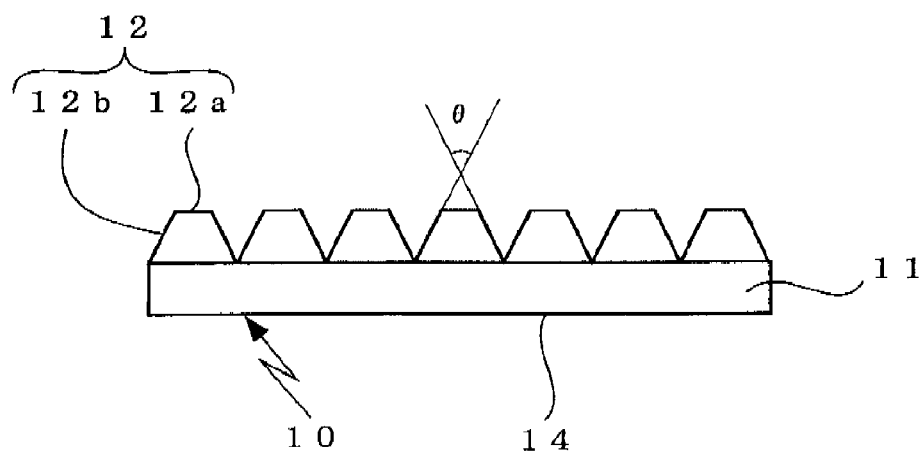
Figure 2:
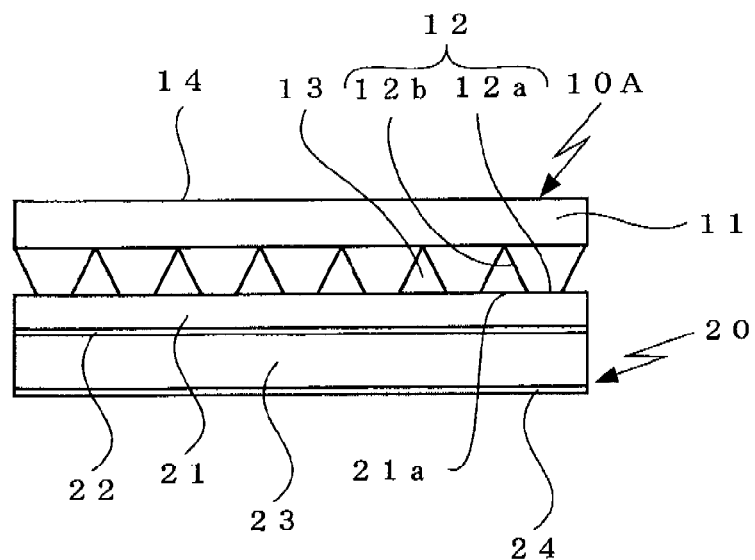
FIG. 2 is a schematic side view showing the surface light emitter according to the above embodiment 1.
Figure 3:
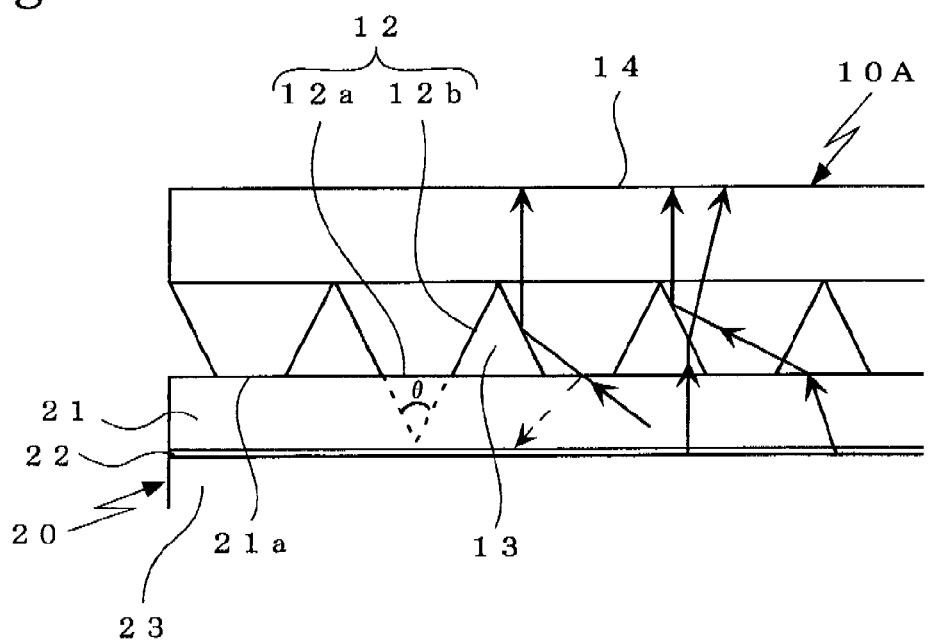
FIG. 3 is an enlarged explanatory diagram of a part of the surface light emitter according to the above embodiment 1.
Figure 4:
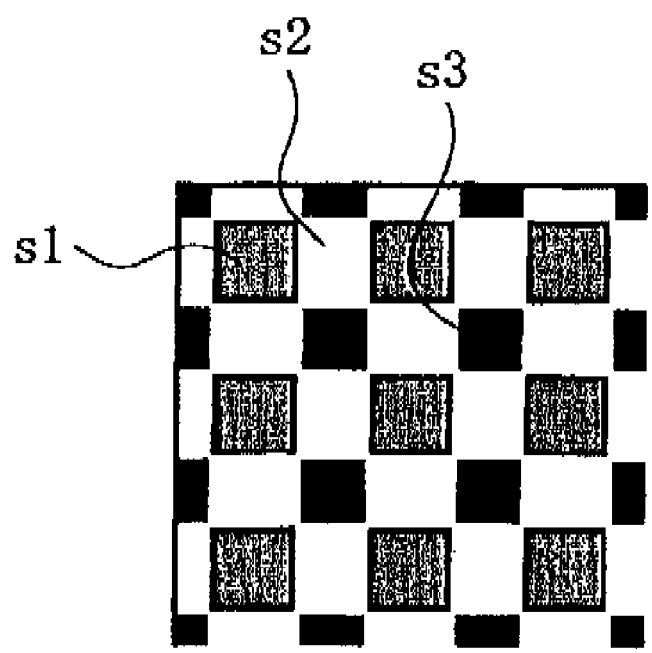
FIG. 4 is a schematic explanatory diagram of a distribution of the front brightness of light outputted from an output surface of the above light control sheet when the surface light emitter of the above embodiment 1 is activated to emit light.
Figure 5:
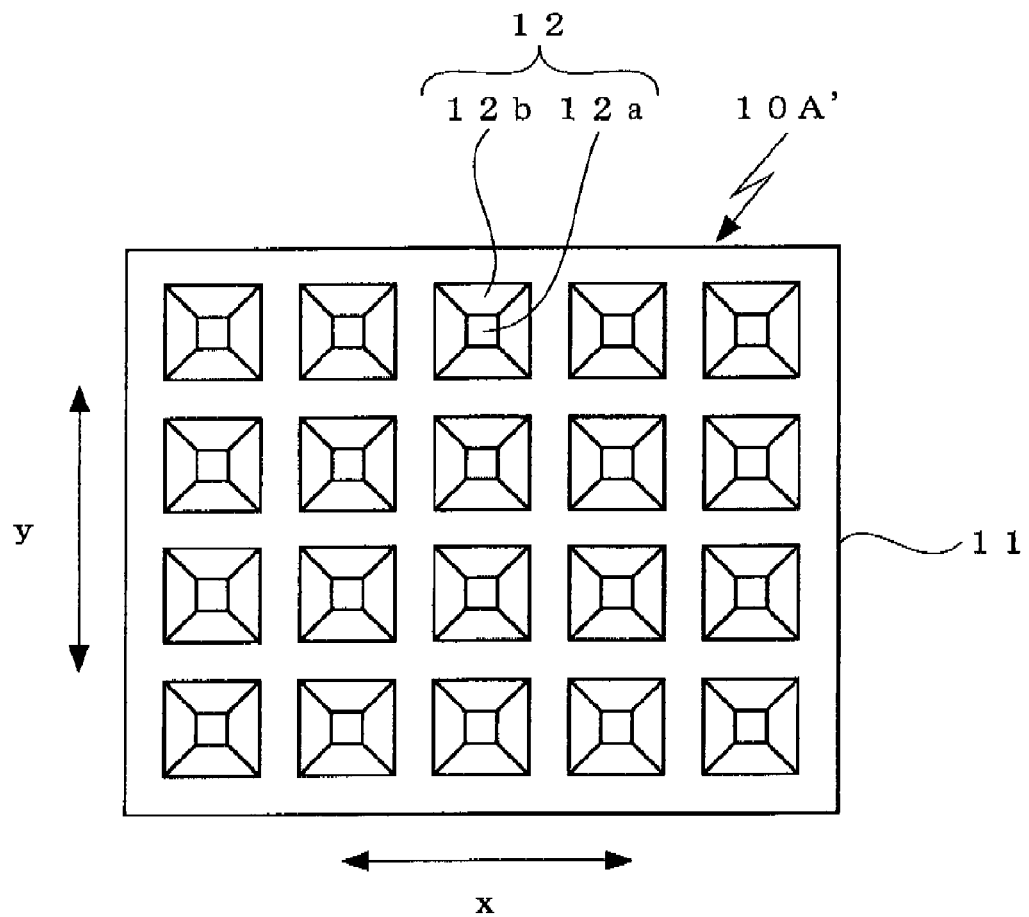
FIG. 5 shows an exemplary modification of the light control sheet used in the surface light emitter of the above embodiment 1, including a schematic plan view of the side formed with the projections and a schematic explanatory diagram of the arrangement of the projections formed on the light control sheet in the x-direction thereof.
Figure 5:
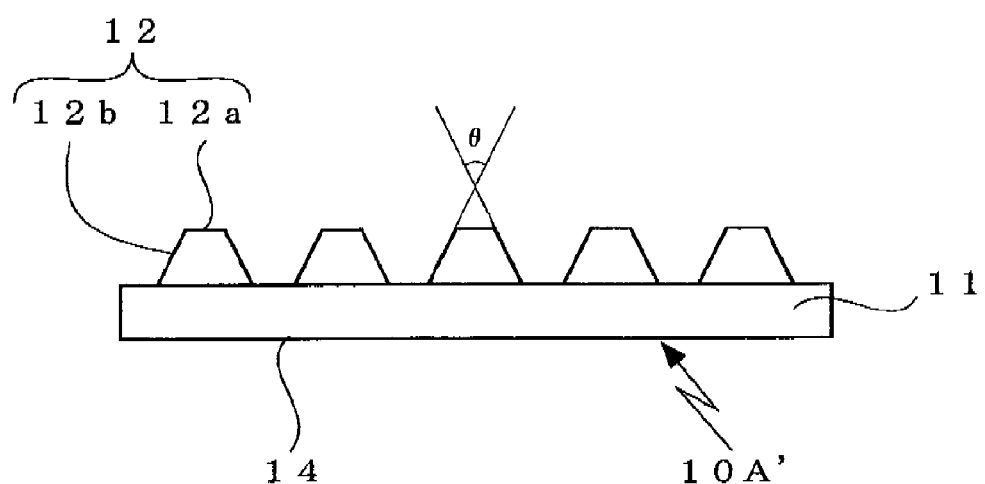
Figure 6:
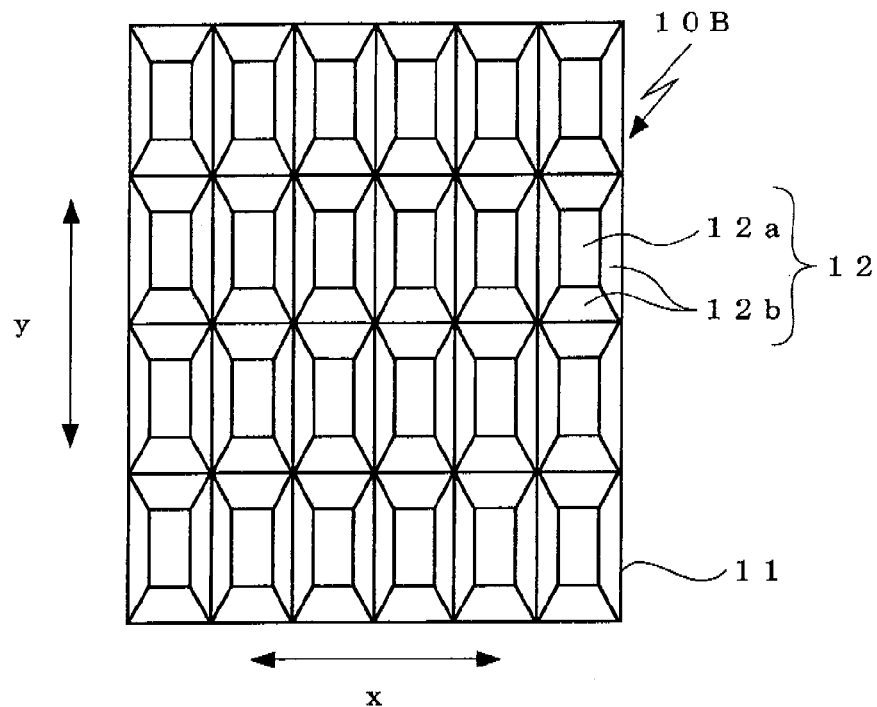
FIG. 6 shows a light control sheet used in a surface light emitter according to an embodiment 2 of the invention, including a schematic plan view of a side formed with projections, a schematic explanatory diagram of the arrangement of the projections in the x-direction of the light control sheet, and a schematic explanatory diagram of the arrangement of the projections in a y-direction of the light control sheet.
Figure 6:
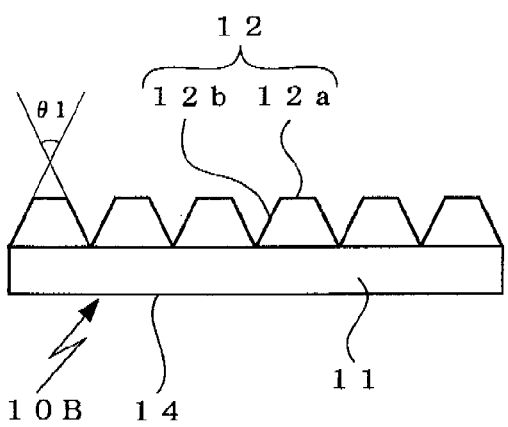
Figure 6:
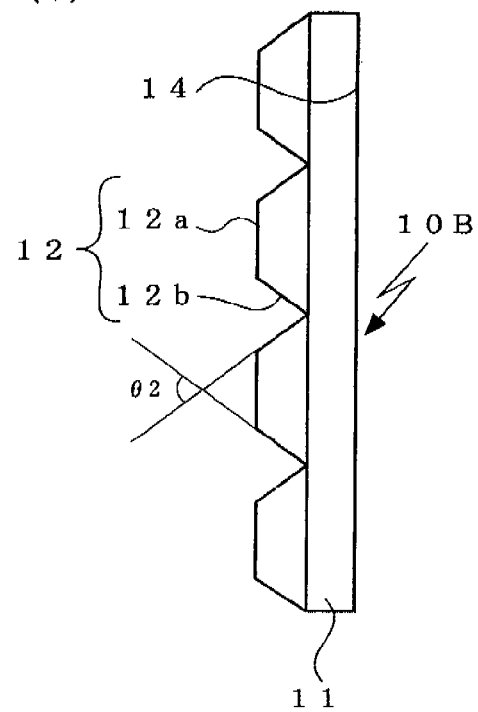
Figure 7:
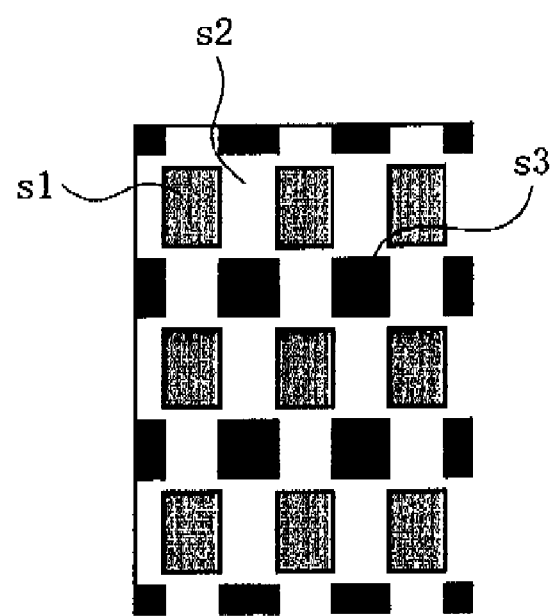
FIG. 7 is a schematic explanatory diagram of a distribution of the front brightness of light outputted from an output surface of the above light control sheet when the surface light emitter of the above embodiment 2 is activated to emit light.
Figure 8:
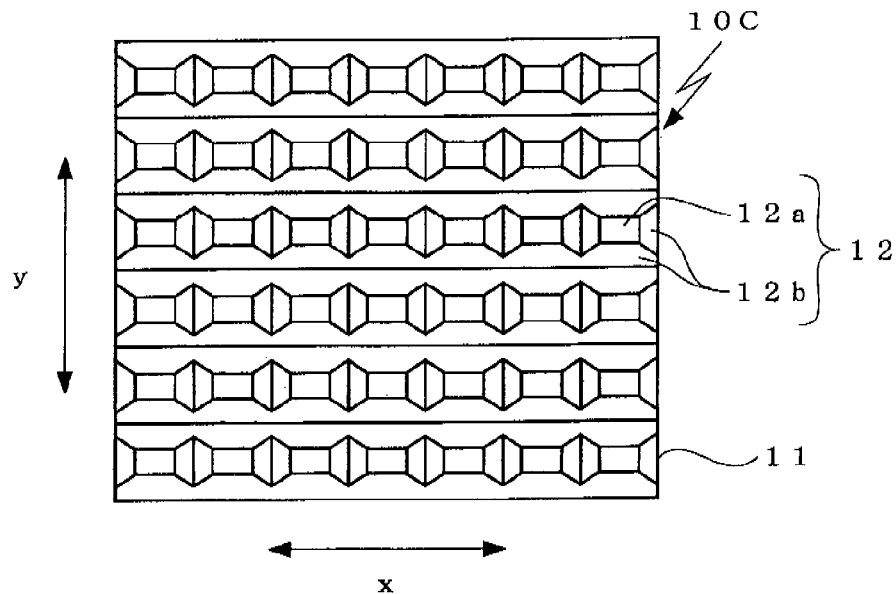
FIG. 8 shows a light control sheet used in a surface light emitter according to an embodiment 3 of the invention, including a schematic plan view of a side formed with projections, a schematic explanatory diagram of the arrangement of the projections in an x-direction of the light control sheet, and a schematic explanatory diagram of the arrangement of the projections in the y-direction of the light control sheet.
Figure 8:
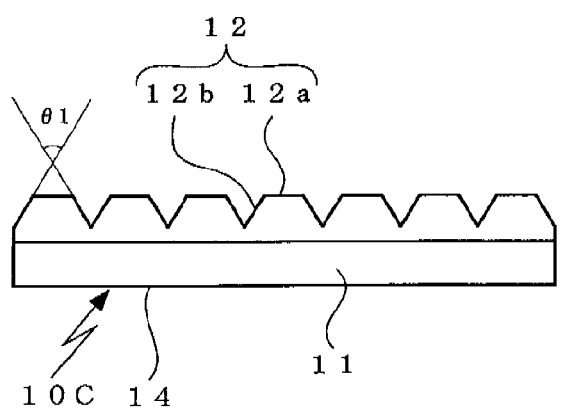
Figure 8:
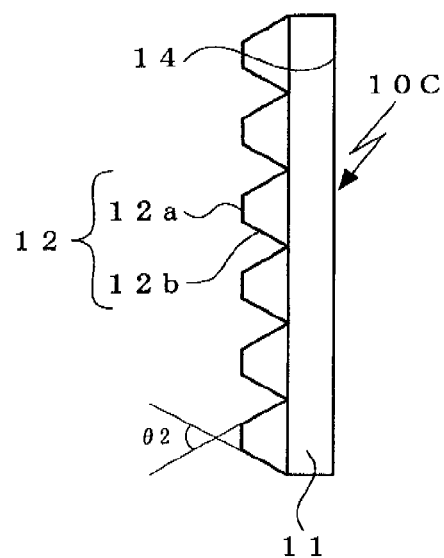
Figure 9:
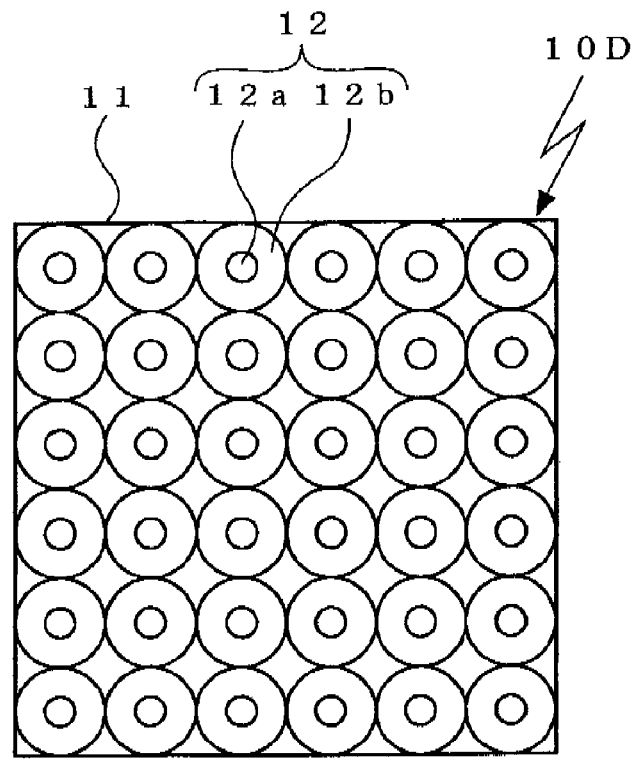
FIG. 9 shows a light control sheet used in a surface light emitter according to an embodiment 4 of the invention, including a schematic plan view of a side formed with projections, and a schematic explanatory diagram of the arrangement of the projections in the x-direction of the light control sheet.
Figure 9:
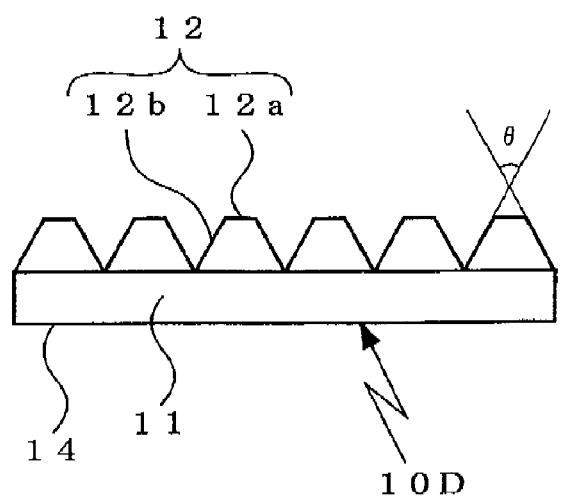
Figure 10:
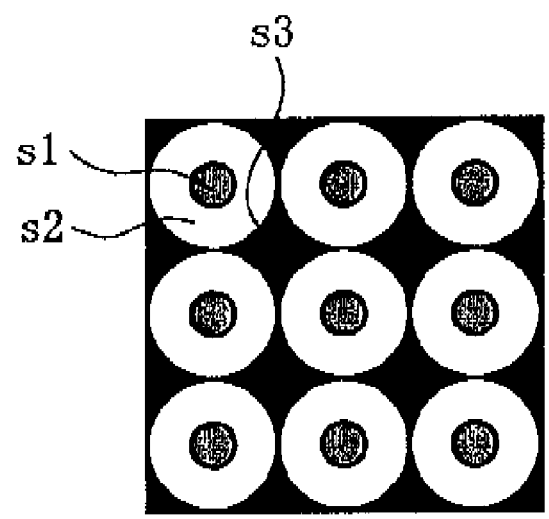
FIG. 10 is a schematic explanatory diagram of a distribution of the front brightness of light outputted from an output surface of the above light control sheet when the surface light emitter of the above embodiment 4 is activated to emit light.
Figure 11:
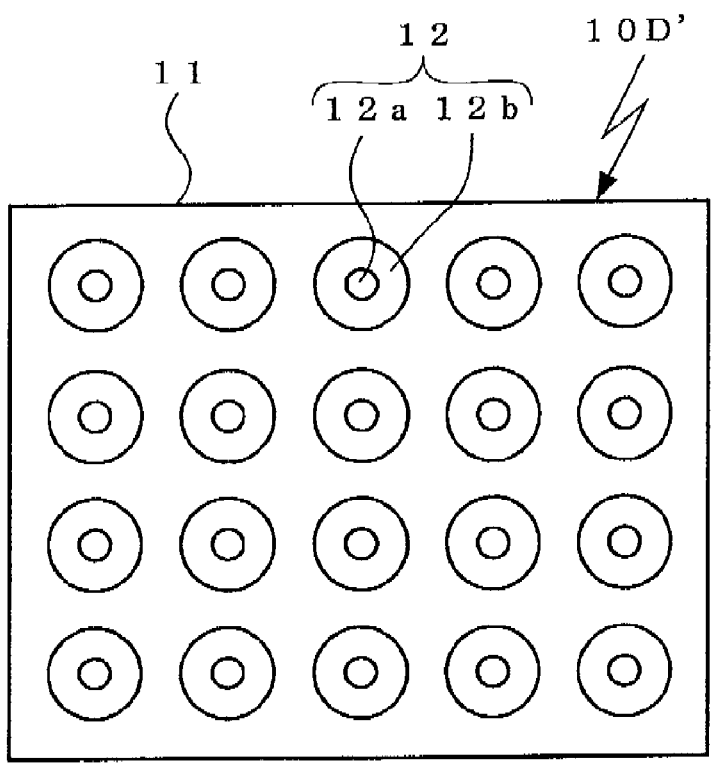
FIG. 11 shows an exemplary modification of the light control sheet used in the surface light emitter of the above embodiment 4, including a schematic plan view of the side formed with the projections and a schematic explanatory diagram of the arrangement of the projections formed on the light control sheet in the x-direction thereof.
Figure 11:
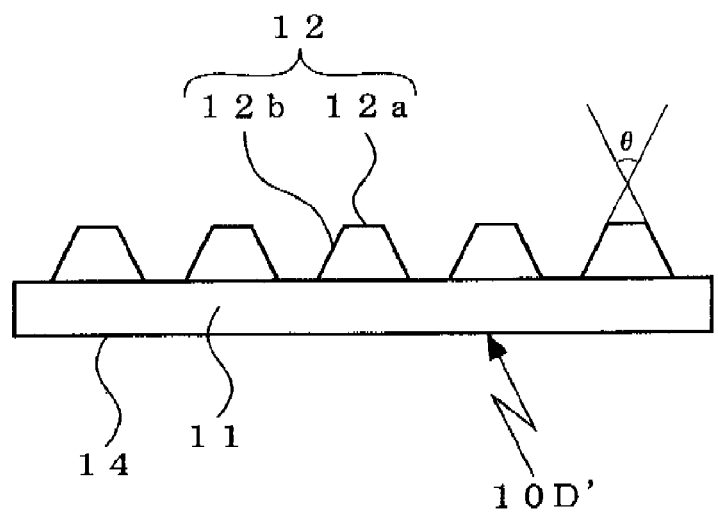
Figure 12:
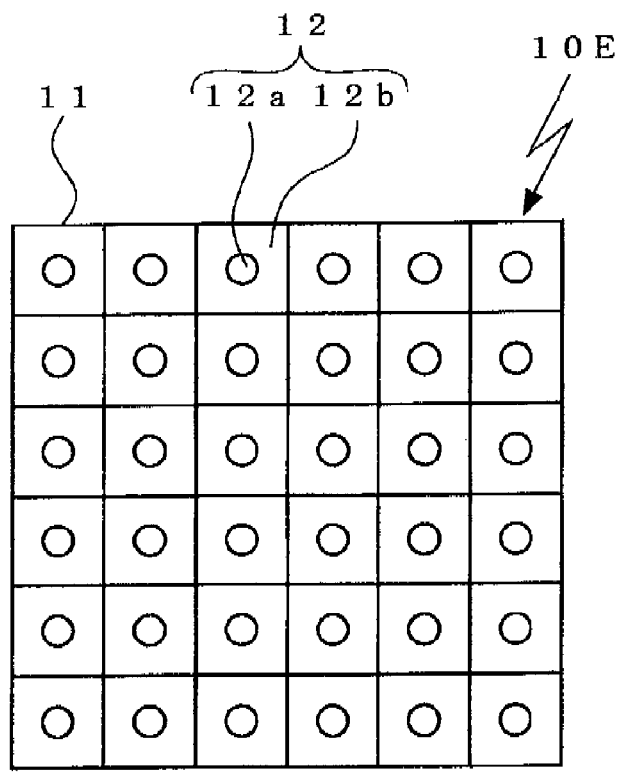
FIG. 12 shows a light control sheet used in a surface light emitter according to an embodiment 5 of the invention, including a schematic plan view of a side formed with projections, and a schematic explanatory diagram of the arrangement of the projections in the x-direction of the light control sheet.
Figure 12:
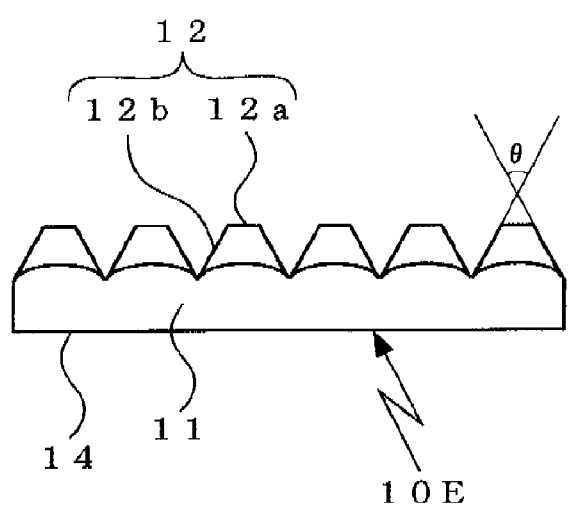
Figure 13:
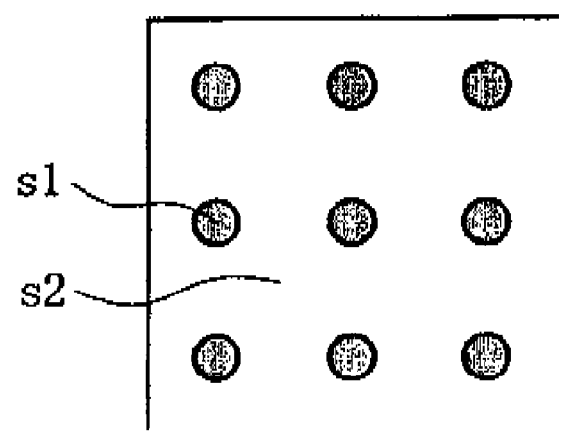
FIG. 13 is a schematic explanatory diagram of a distribution of the front brightness of light outputted from an output surface of the above light control sheet when the surface light emitter of the above embodiment 5 is activated to emit light.
Figure 14:
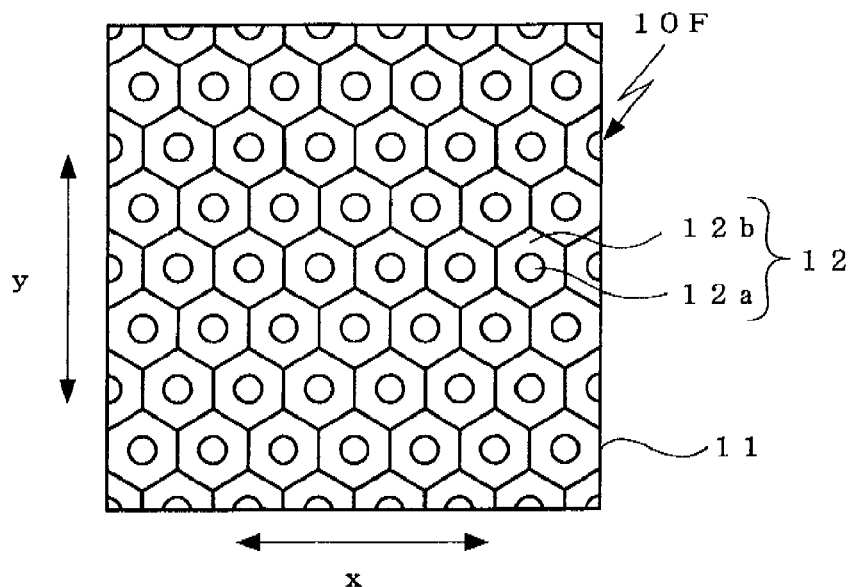
FIG. 14 shows a light control sheet used in a surface light emitter according to an embodiment 6 of the invention, including a schematic plan view of a side formed with projections, a schematic explanatory diagram of the arrangement of the projections in the x-direction of the light control sheet, and a schematic explanatory diagram of the arrangement of the projections in the y-direction of the light control sheet.
Figure 14:
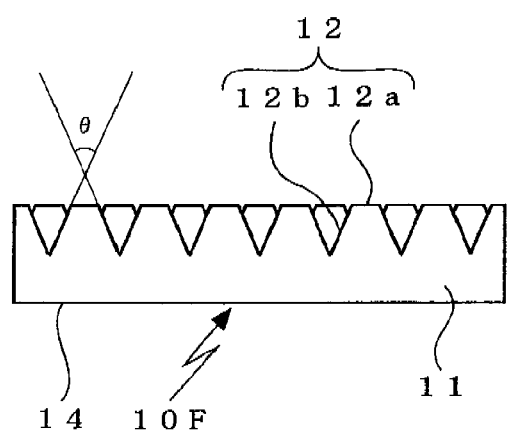
Figure 14:
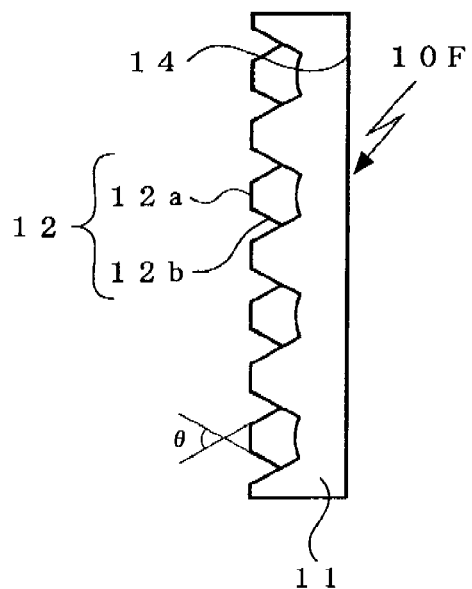
Figure 15:
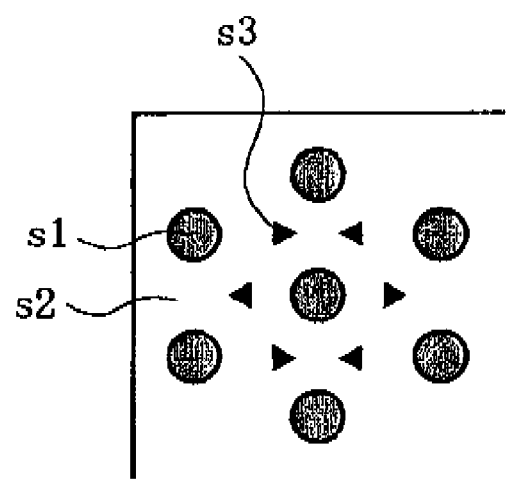
FIG. 15 is a schematic explanatory diagram of a distribution of the front brightness of light outputted from an output surface of the above light control sheet when the surface light emitter of the above embodiment 6 is activated to emit light.
Figure 16:
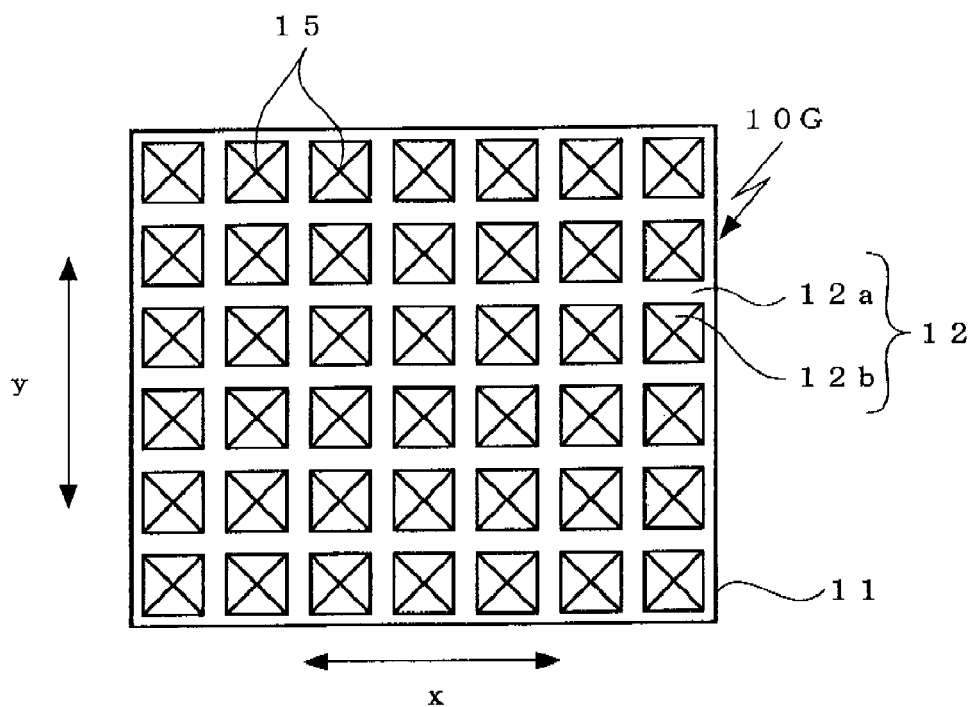
FIG. 16 shows a light control sheet used in a surface light emitter according to an embodiment 7 of the invention, including a schematic plan view of a side formed with projections, and a schematic sectional view showing the arrangement of the projections in the x-direction of the light control sheet.
Figure 16:
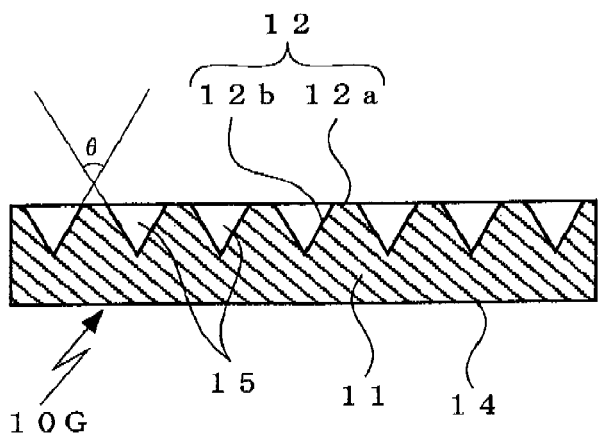
Figure 17:
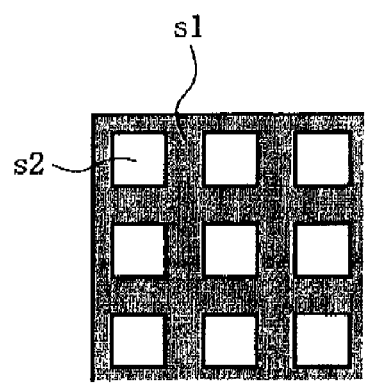
FIG. 17 is a schematic explanatory diagram of a distribution of the front brightness of light outputted from an output surface of the above light control sheet when the surface light emitter of the above embodiment 7 is activated to emit light.
Figure 18:
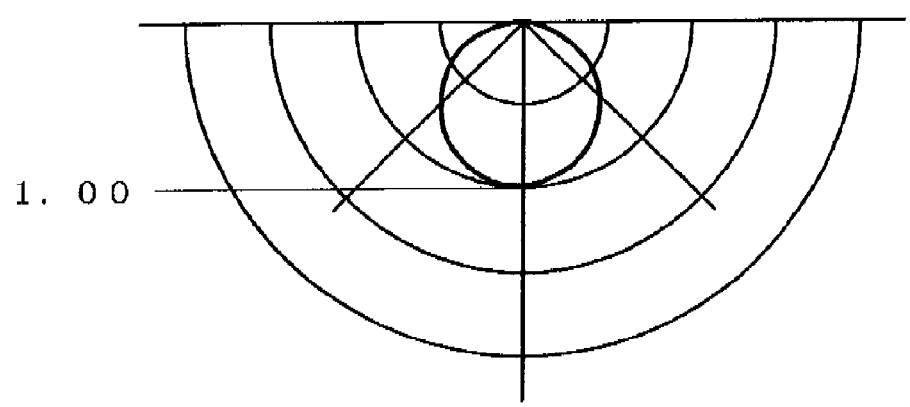
FIG. 18 is a chart showing a luminous intensity distribution characteristic of light of a surface light emitter of a comparative example 1.
Figure 19:
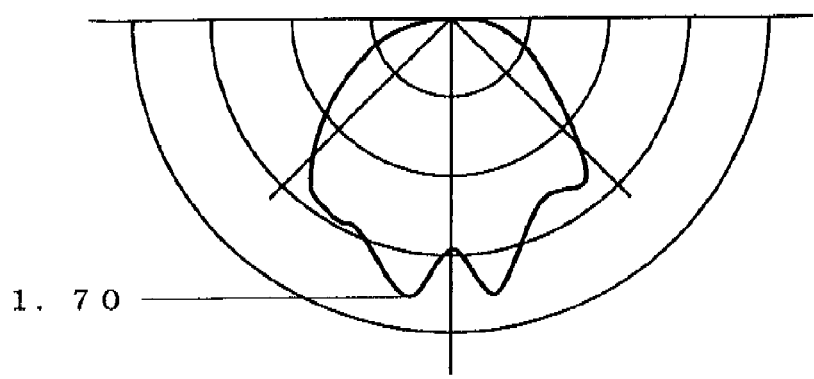
FIG. 19 is a chart showing a luminous intensity distribution characteristic of light of a surface light emitter of an example 1.
Figure 20:
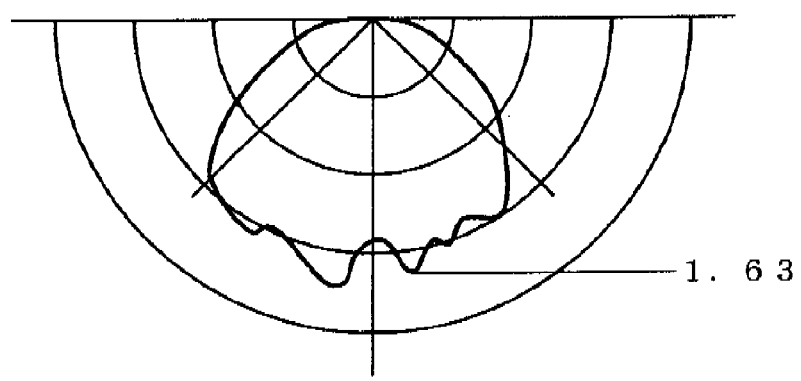
FIG. 20 is a chart showing a luminous intensity distribution characteristic of light of a surface light emitter of an example 2.
Figure 21:
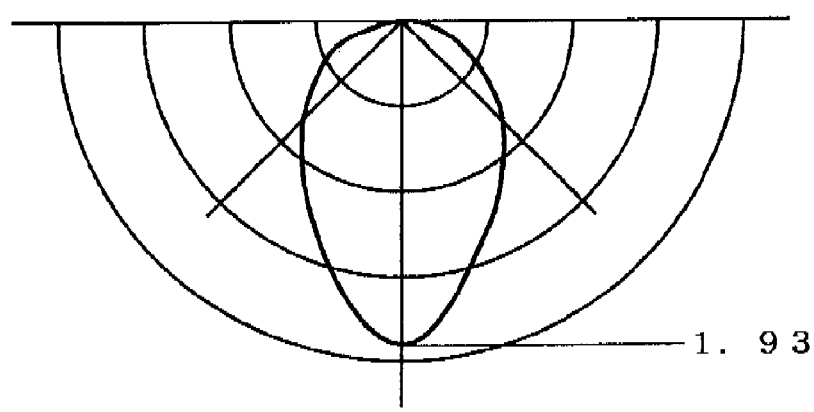
FIG. 21 is a chart showing a luminous intensity distribution characteristic of light of a surface light emitter of an example 3.
Figure 22:
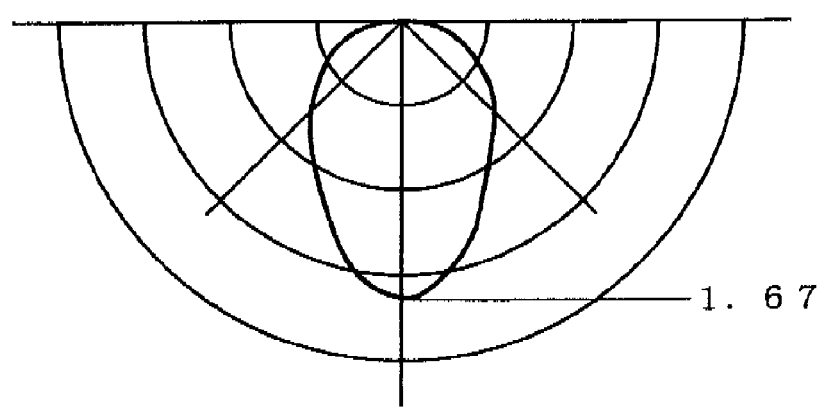
FIG. 22 is a chart showing a luminous intensity distribution characteristic of light of a surface light emitter of an example 4.
Figure 23:
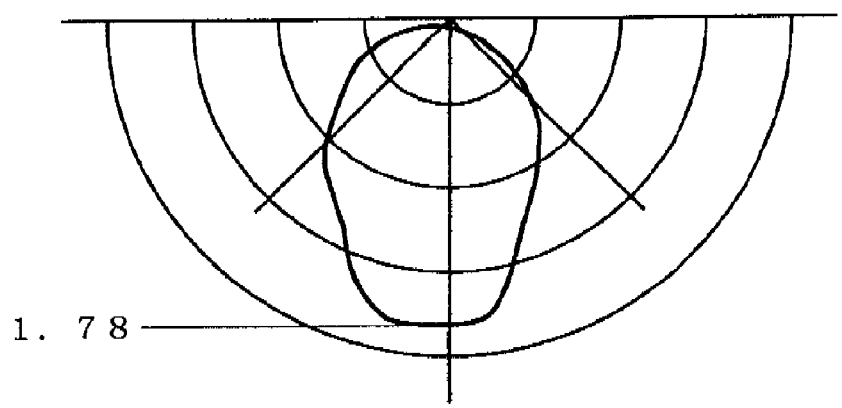
FIG. 23 is a chart showing a luminous intensity distribution characteristic of light of a surface light emitter of an example 5.
Figure 24:
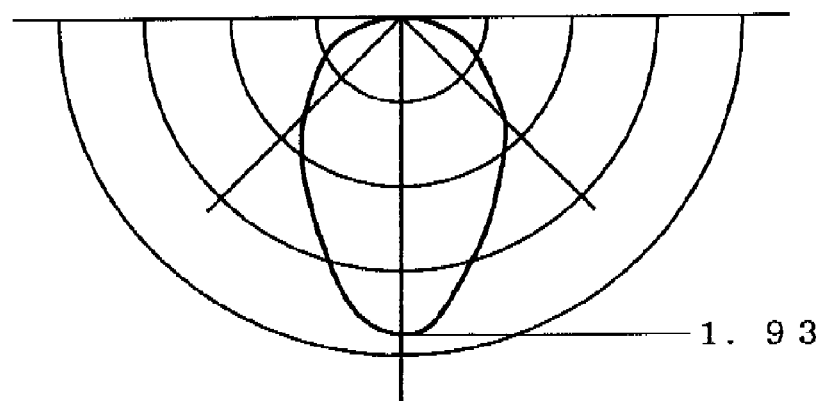
FIG. 24 is a chart showing a luminous intensity distribution characteristic of light of a surface light emitter of an example 6.
Figure 25:
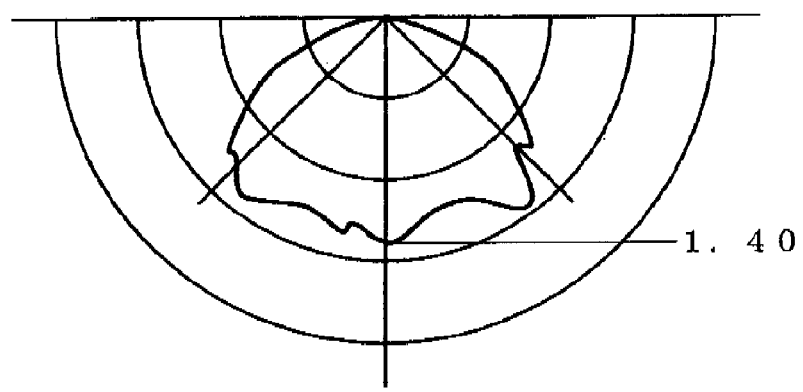
FIG. 25 is a chart showing a luminous intensity distribution characteristic of light a surface light emitter of a comparative example 2.
Figure 26:
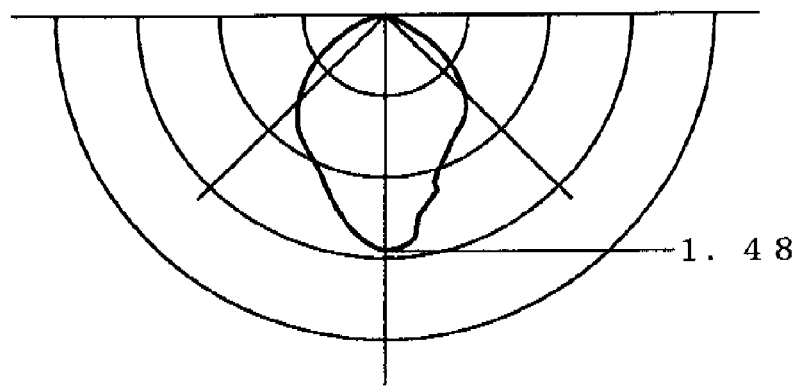
FIG. 26 is a chart showing a luminous intensity distribution characteristic of light of a surface light emitter of a comparative example 3.
Figure 27:
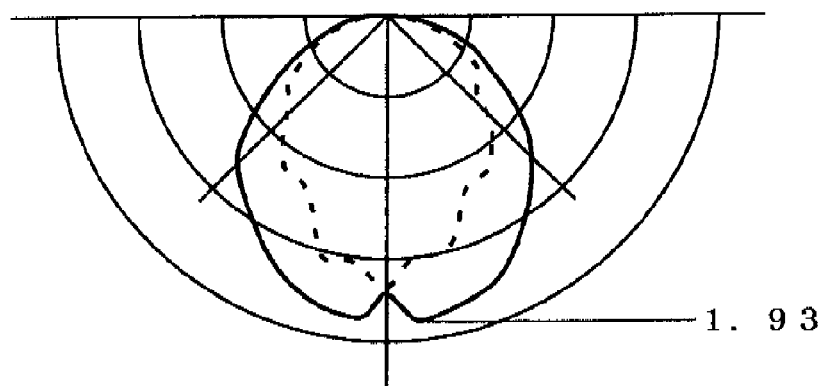
FIG. 27 is a chart showing a luminous intensity distribution characteristic of light of a surface light emitter of an example 7.
Figure 28:
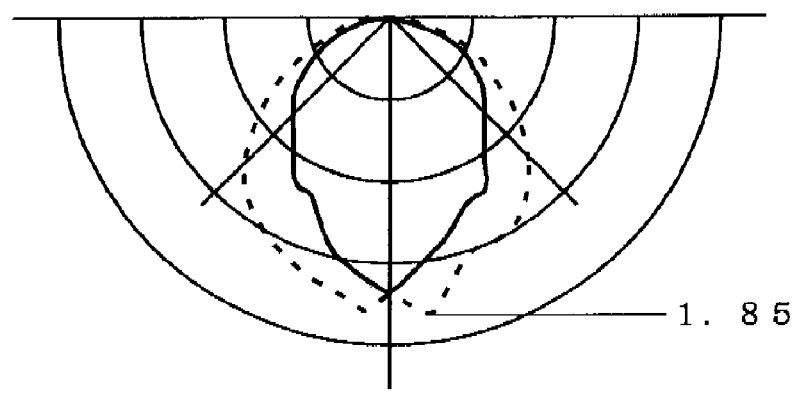
FIG. 28 is a chart showing a luminous intensity distribution characteristic of light of a surface light emitter of an example 8.
Figure 29:
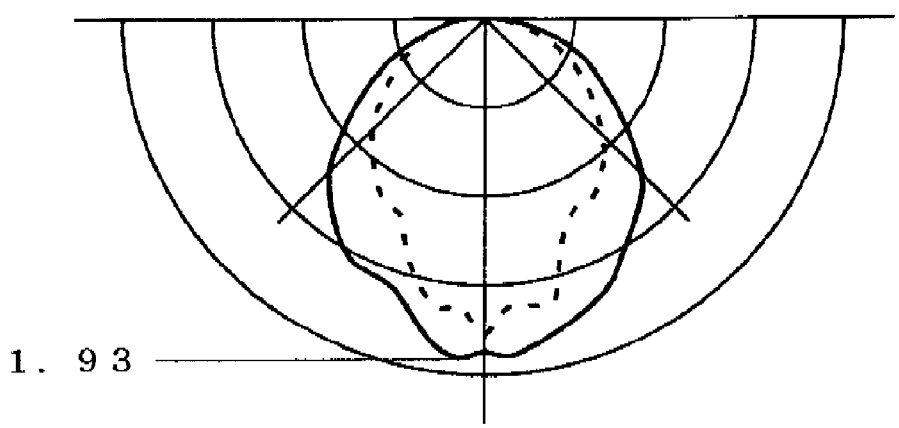
FIG. 29 is a chart showing a luminous intensity distribution characteristic of light of a surface light emitter of an example 9.
Figure 30:
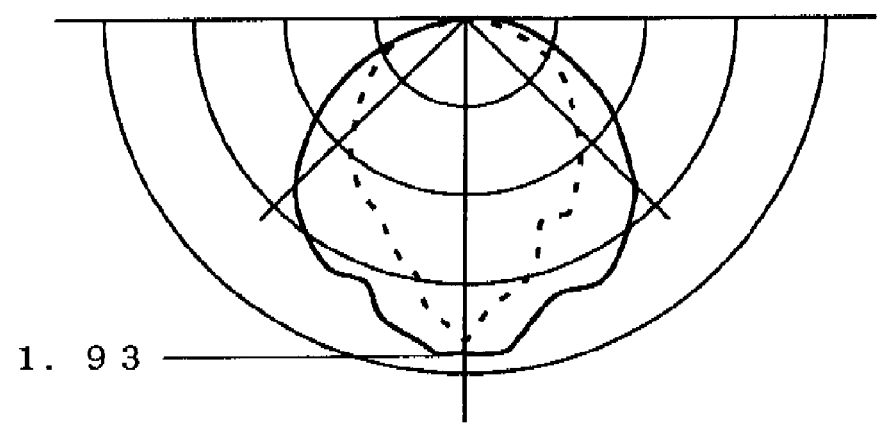
FIG. 30 is a chart showing a luminous intensity distribution characteristic of light of a surface light emitter of an example 10.
Figure 31:
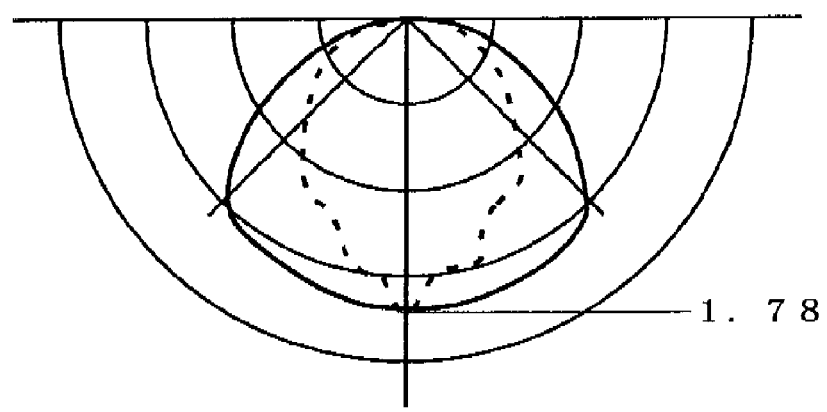
FIG. 31 is a chart showing a luminous intensity distribution characteristic of light of a surface light emitter of an example 11.
Figure 32:
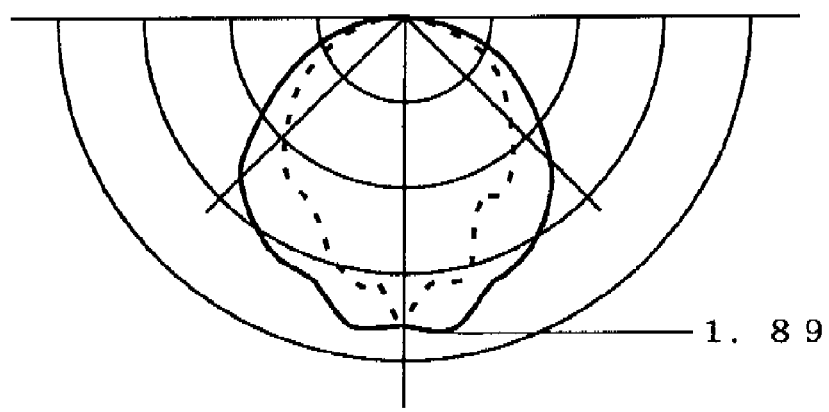
FIG. 32 is a chart showing a luminous intensity distribution characteristic of light of a surface light emitter of an example 12.
Figure 33:
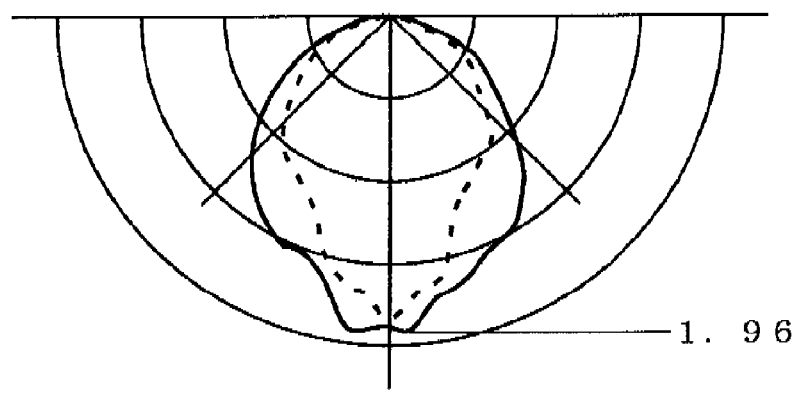
FIG. 33 is a chart showing a luminous intensity distribution characteristic of light of a surface light emitter of an example 13.
Figure 34:
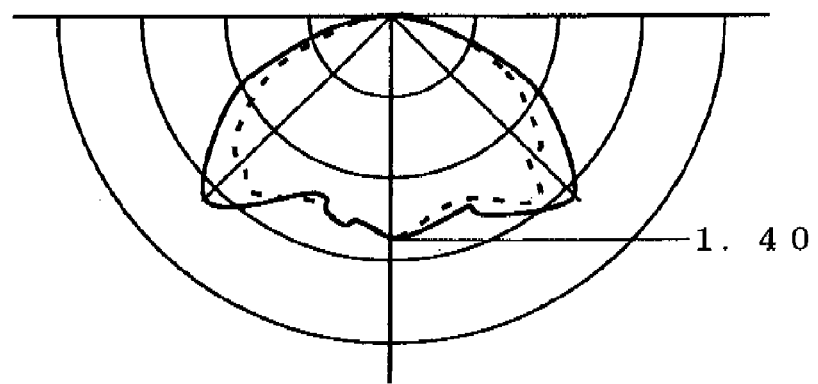
FIG. 34 is a chart showing a luminous intensity distribution characteristic of light of a surface light emitter of a comparative example 4.
Figure 35:
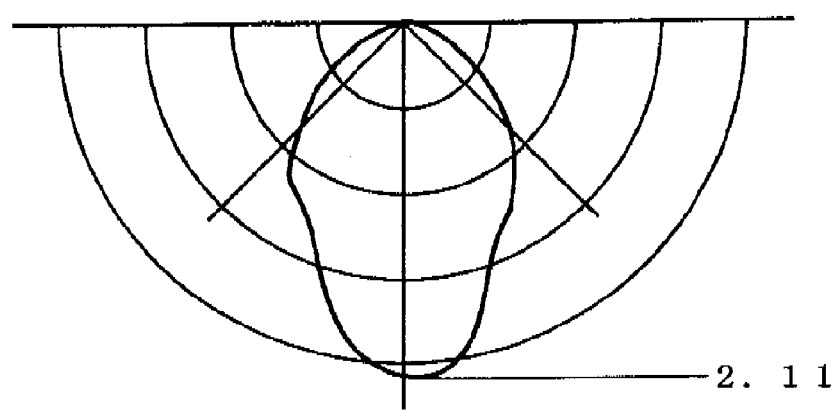
FIG. 35 is a chart showing a luminous intensity distribution characteristic of light of a surface light emitter of an example 14.
Figure 36:
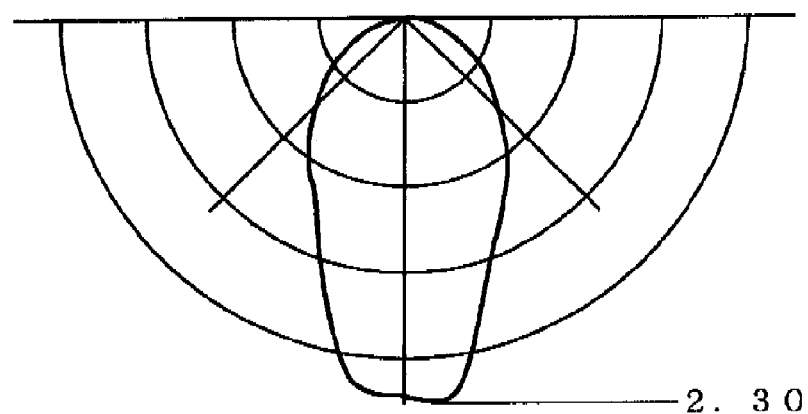
FIG. 36 is a chart showing a luminous intensity distribution characteristic of light of a surface light emitter of an example 15.
Figure 37:
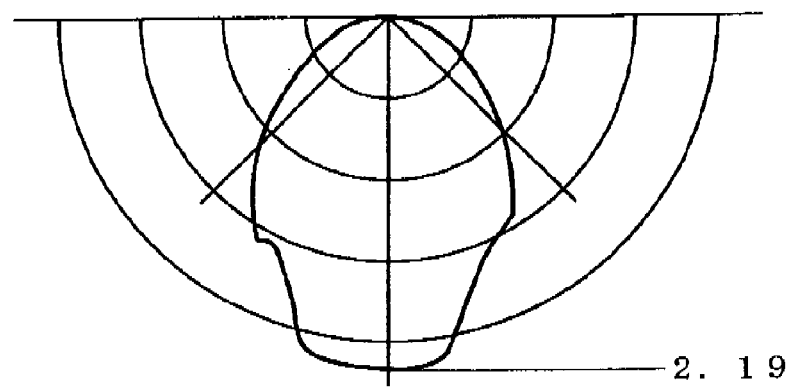
FIG. 37 is a chart showing a luminous intensity distribution characteristic of light of a surface light emitter of an example 16.
Figure 38:
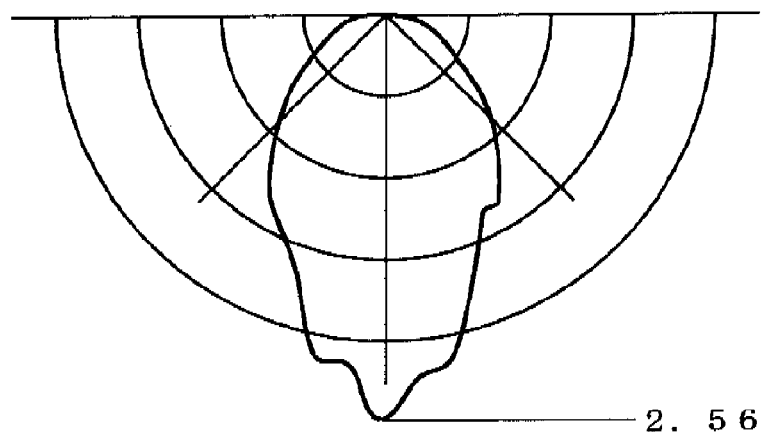
FIG. 38 is a chart showing a luminous intensity distribution characteristic of light of a surface light emitter of an example 17.
Figure 39:
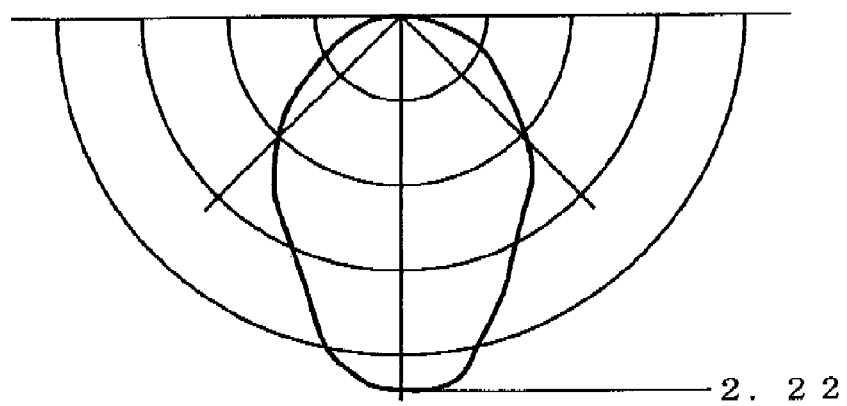
FIG. 39 is a chart showing a luminous intensity distribution characteristic of light of a surface light emitter of an example 18.
Figure 40:
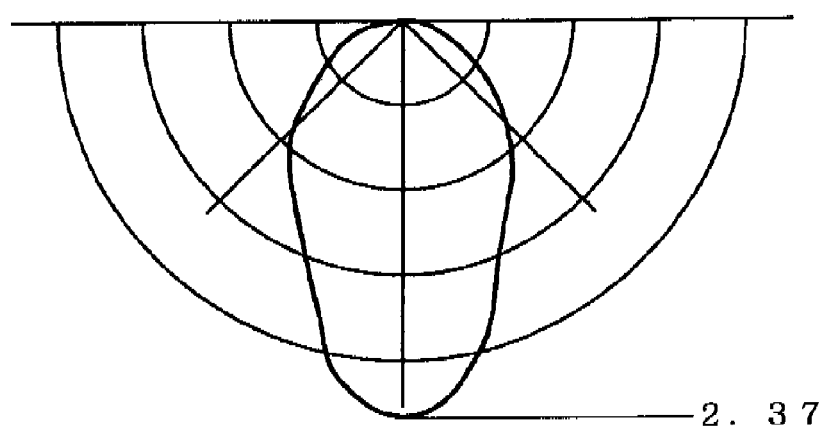
FIG. 40 is a chart showing a luminous intensity distribution characteristic of light of a surface light emitter of an example 19.
Figure 41:
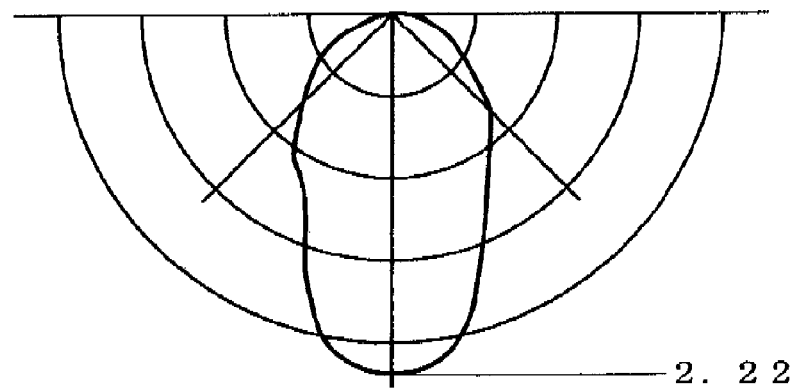
FIG. 41 is a chart showing a luminous intensity distribution characteristic of light of a surface light emitter of an example 20.
Figure 42:
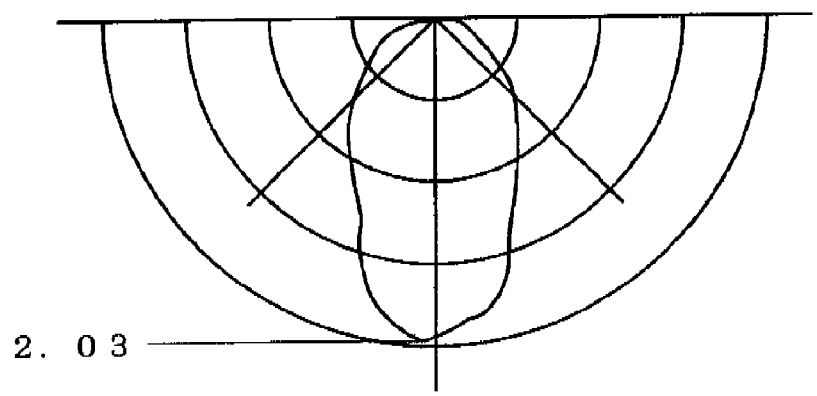
FIG. 42 is a chart showing a luminous intensity distribution characteristic of light of a surface light emitter of an example 21.
Figure 43:
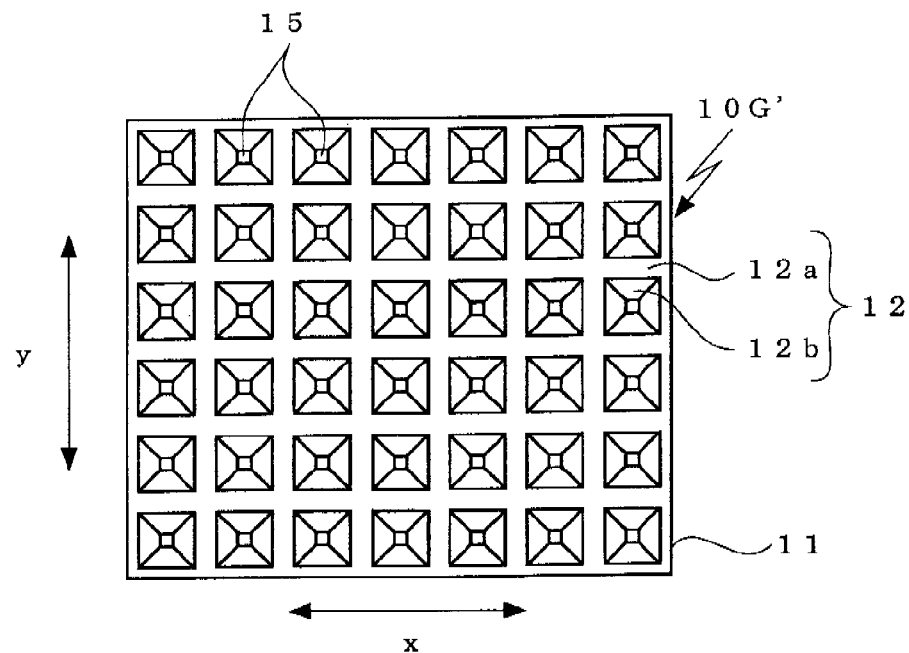
FIG. 43 shows an exemplary modification of the light control sheet used in the surface light emitter of the above embodiment 7 and formed with recesses extending through a transparent substrate thereof, including a schematic plan view of the side formed with the projections, and a schematic sectional view showing the arrangement of the projections formed on the light control sheet in the x-direction thereof.
Figure 43:
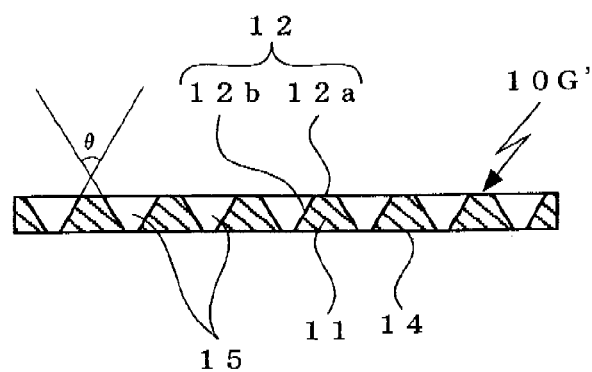
Figure 44:
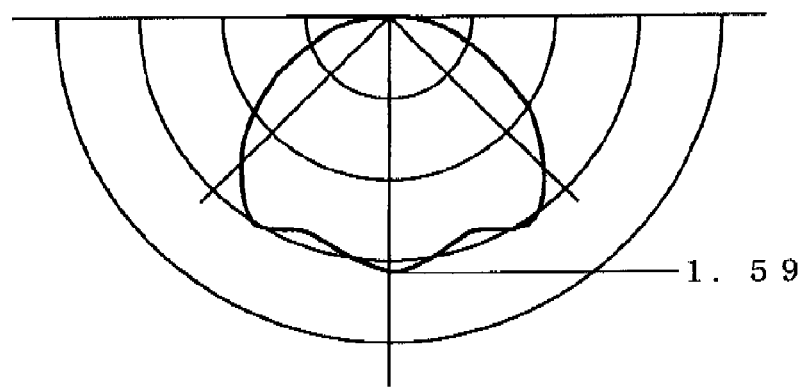
FIG. 44 is a chart showing a luminous intensity distribution characteristic of light of a surface light emitter of an example 22.
Figure 45:
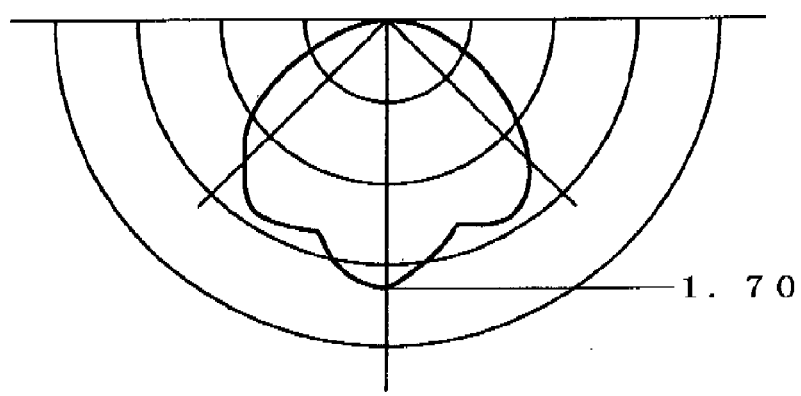
FIG. 45 is a chart showing a luminous intensity distribution characteristic of light of a surface light emitter of an example 23.
Figure 46:
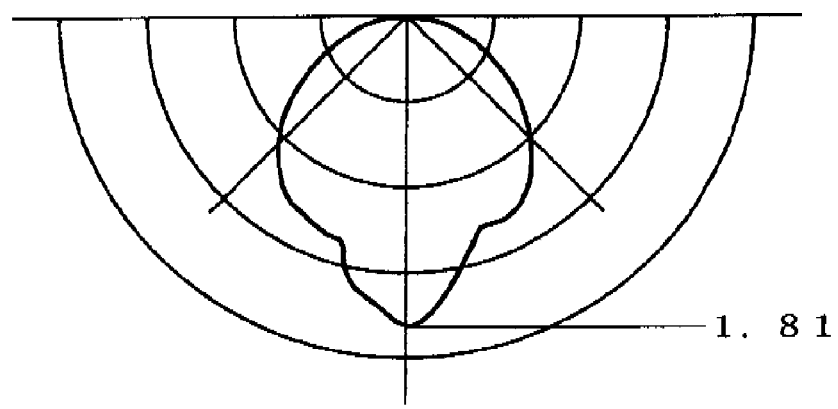
FIG. 46 is a chart showing a luminous intensity distribution characteristic of light of a surface light emitter of an example 24.
Figure 47:
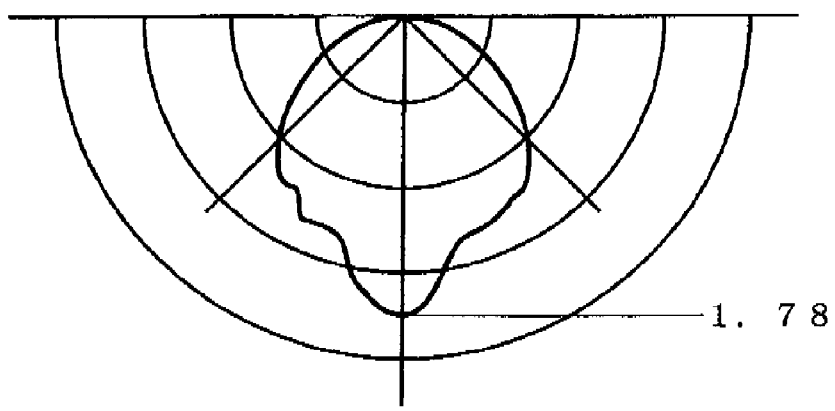
FIG. 47 is a chart showing a luminous intensity distribution characteristic of light of a surface light emitter of an example 25.

DESCRIPTION OF REFERENCE CHARACTERS 10A, 10A', 10B, 10C, 10D, 10D', 10E, 10F, 10G, 10G': LIGHT CONTROL SHEET
11: TRANSPARENT SUBSTRATE
12: PROJECTION
12a: PLANAR PORTION AT DISTAL END OF PROJECTION
12b: SLANT SIDE OF PROJECTION
13: HOLLOW PORTION
14: OUTPUT SURFACE
15: RECESS
21: TRANSPARENT SUBSTRATE
21a: OUTPUT SURFACE
22: TRANSPARENT ELECTRODE
23: ORGANIC EL LAYER
24: COUNTER ELECTRODE
$\theta$, $\theta_1$, $\theta_2$: APEX ANGLE OF PROJECTION
s1: ZONE OF LIGHT CONTROL SHEET WHERE PLANAR PORTION AT DISTAL END OF PROJECTION IS BONDED
s2: ZONE HAVING HIGHER FRONT BRIGHTNESS THAN s1
s3: ZONE HAVING LOWER FRONT BRIGHTNESS THAN s1

The invention claimed is:

1. A surface light emitter comprising a surface-emitting device and a light control sheet, wherein a repetitive concavo-convex pattern of trapezoidal form in section is formed at least on one side of the light control sheet and has planar portions at distal ends of projections thereof tightly bonded to an output surface of the surface-emitting device, and wherein the light control sheet satisfies a condition $0.75 > D > 4[(\sin \theta - 1/n)^2 + 0.034]$ where $\theta$ represents the apex angle formed by opposite slant sides defining the trapezoidal projection of the light control sheet, n represents the refractive index of the light control sheet, and D represents the ratio of a length of a zone to a one-cycle length of the repetitive concavo-convex pattern of the light control sheet as determined in one of the pattern arrangement directions, the zone tightly bonded to the output surface of the surface-emitting device.

2. A surface light emitter according to claim 1, wherein in a case where the concavo-convex pattern of the light control sheet has different ratios D of the length of the zone tightly bonded to the output surface of the surface-emitting device to the one-cycle length of the concavo-convex pattern as determined in the pattern arrangement directions, the smaller value of the ratio D satisfies the condition $0.75>D>4[(\sin\theta-1/n)^2+0.034]$.

3. A surface light emitter according to claim 1, wherein the projection of the concavo-convex pattern formed on the one side of the light control sheet has a cross-sectional profile of isosceles trapezoid shape.

4. A surface light emitter according to claim 1, wherein in a case where the projection of the concavo-convex pattern formed on the one side of the light control sheet is shaped like a truncated pyramid, the ratio D satisfies a condition $0.58>D>4[(\sin\theta-½)^2+0.058]$.

5. A surface light emitter according to claim 1, wherein in a case where the projection of the concavo-convex pattern formed on the one side of the light control sheet is shaped like a truncated cone, the ratio D satisfies a condition $0.55>D>4[(\sin\theta-½)^2+0.04]$.

6. A surface light emitter according to claim 1, wherein in a case where a recess of the concavo-convex pattern formed on the one side of the light control sheet is shaped like an inverted pyramid or a truncated inverted pyramid, the ratio D satisfies a condition $0.4>D>4[(\sin\theta-½)^2+0.034]$.

7. A surface light emitter comprising a surface-emitting device and a light control sheet, wherein a repetitive concavo-convex pattern is formed at least on one side of the light control sheet and has planar portions at distal ends of projections thereof tightly bonded to an output surface of the surface-emitting device, and wherein the light control sheet satisfies a condition $0.04S0<S1<1.4S2$ where S0 represents the luminous area of the surface-emitting device, S1 represents the area of zones where the projections are tightly bonded to the output surface of the surface-emitting device, and S2 represents the area of zones having higher front brightness than that of the zones where the projections are tightly bonded to the output surface of the surface-emitting device.

8. A surface light emitter according to claim 7, wherein the projection of the concavo-convex pattern formed on the one side of the light control sheet has a cross-sectional profile of trapezoid shape in at least one direction thereof.

9. A surface light emitter according to claim 7, satisfying a condition $0.09S0<S1<0.5S2$ where S0 represents the luminous area of the surface-emitting device, S1 represents the area of the zones where the projections are tightly bonded to the output surface of the surface-emitting device, and S2 represents the area of the zones having higher front brightness than that of the zones where the projections are tightly bonded to the output surface of the surface-emitting device.

* * * * *